United States Patent
Li et al.

(10) Patent No.: US 10,432,943 B2
(45) Date of Patent: *Oct. 1, 2019

(54) SIGNALING COLOR VALUES FOR 3D LOOKUP TABLE FOR COLOR GAMUT SCALABILITY IN MULTI-LAYER VIDEO CODING

(71) Applicant: QUALCOMM Incorporated, San Diego, CA (US)

(72) Inventors: Xiang Li, San Diego, CA (US); Jianle Chen, San Diego, CA (US); Marta Karczewicz, San Diego, CA (US)

(73) Assignee: QUALCOMM Incorporated, San Deigo, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/654,580

(22) Filed: Jul. 19, 2017

(65) Prior Publication Data

US 2018/0014019 A1   Jan. 11, 2018

Related U.S. Application Data

(63) Continuation of application No. 14/572,002, filed on Dec. 16, 2014, now Pat. No. 9,756,337.

(Continued)

(51) Int. Cl.
*H04N 19/136* (2014.01)
*H04N 19/124* (2014.01)
(Continued)

(52) U.S. Cl.
CPC ......... *H04N 19/136* (2014.11); *H04N 19/105* (2014.11); *H04N 19/124* (2014.11);
(Continued)

(58) Field of Classification Search
CPC .................................................. H04N 19/136
See application file for complete search history.

(56) References Cited

U.S. PATENT DOCUMENTS 7,843,465 B1   11/2010   Shaick
8,098,260 B1   1/2012   Shaick
(Continued)

FOREIGN PATENT DOCUMENTS

CN   102119532 A   7/2011
CN   105556943 A   5/2016
(Continued)

OTHER PUBLICATIONS

Taiwan Search Report—TW103144175—TIPO—dated Jul. 17, 2018—1 pp.

(Continued)

*Primary Examiner* — James M Pontius
(74) *Attorney, Agent, or Firm* — Shumaker & Sieffert, P.A.

(57) ABSTRACT

Techniques are described for signaling information used to generate three-dimensional (3D) color lookup tables for color gamut scalability in multi-layer video coding. A lower layer of video data may include color data in a first color gamut and a higher layer of the video data may include color data in a second color gamut. To generate inter-layer reference pictures, a video encoder and/or video decoder performs color prediction to convert the color data of a reference picture in the first color gamut to the second color gamut. The video coder may perform color prediction using a 3D lookup table. According to the techniques, a video encoder may encode partition information and/or color values of a 3D lookup table generated for color gamut scalability. A video decoder may decode the partition infor- (Continued)

mation and/or color values to generate the 3D lookup table in order to perform color gamut scalability.

46 Claims, 17 Drawing Sheets

Related U.S. Application Data

(60) Provisional application No. 62/005,845, filed on May 30, 2014, provisional application No. 61/917,228, filed on Dec. 17, 2013.

(51) Int. Cl.
| | | |
|---|---|---|
| *H04N 19/30* | (2014.01) | |
| *H04N 19/186* | (2014.01) | |
| *H04N 19/42* | (2014.01) | |
| *H04N 19/105* | (2014.01) | |
| *H04N 19/70* | (2014.01) | |

(52) U.S. Cl.
CPC ........... *H04N 19/186* (2014.11); *H04N 19/30* (2014.11); *H04N 19/42* (2014.11); *H04N 19/70* (2014.11)

(56) References Cited

U.S. PATENT DOCUMENTS

| | | | |
|---|---|---|---|
| 8,446,961 | B2 | 5/2013 | Chiu et al. |
| 9,756,337 | B2* | 9/2017 | Li .................. H04N 19/136 |
| 9,955,174 | B2 | 4/2018 | Ye et al. |
| 2003/0234795 | A1 | 12/2003 | Lee |
| 2005/0078755 | A1 | 4/2005 | Woods et al. |
| 2007/0201560 | A1 | 8/2007 | Segall et al. |
| 2007/0247647 | A1 | 10/2007 | Pettigrew et al. |
| 2009/0097561 | A1 | 4/2009 | Chiu et al. |
| 2009/0110073 | A1 | 4/2009 | Wu et al. |
| 2009/0285283 | A1 | 11/2009 | Gao et al. |
| 2012/0230421 | A1 | 9/2012 | Chen et al. |
| 2014/0003527 | A1 | 1/2014 | Tourapis |
| 2015/0098510 | A1 | 4/2015 | Ye et al. |
| 2015/0103902 | A1 | 4/2015 | Li et al. |
| 2015/0172616 | A1 | 6/2015 | Ye et al. |
| 2015/0172670 | A1 | 6/2015 | Li et al. |
| 2015/0229934 | A1 | 8/2015 | Li et al. |
| 2016/0295219 | A1* | 10/2016 | Ye .................. G06T 9/40 |
| 2017/0318298 | A1* | 11/2017 | Li .................. H04N 19/136 |
| 2018/0014018 | A1* | 1/2018 | Li .................. H04N 19/136 |
| 2018/0014019 | A1* | 1/2018 | Li .................. H04N 19/136 |

FOREIGN PATENT DOCUMENTS

| | | |
|---|---|---|
| JP | H07288707 A | 10/1995 |
| JP | 2009100473 A | 5/2009 |
| JP | 2010531584 A | 9/2010 |
| WO | 2012122425 A1 | 9/2012 |
| WO | 2012147010 A1 | 11/2012 |

OTHER PUBLICATIONS

Auyeung, et al., "Color Gamut Scalable Video Coding with Piecewise Linear Predictions," JCT-3V meeting; MPEG meeting; Jul. 29-Aug. 2, 2013; (The Joint Collaborative Team on 3D Video Coding Extension Development of ISO/IEC JTC1/SC29/WG11 and ITU-T SG.16), Jul. 2013, Document No. JCTVC-N0271, 3 pp.

Bordes P., et al., "SCE4: Results on 53-test1 and 53-test2", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-O0159-v3, Oct. 22, 2013 (Oct. 22, 2013), XP030115182 pp. 1-12.

Bordes P., et al., "AHG14: Color Gamut Scalable Video Coding using 3D LUT: New Results", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/,, No. JCTVC-N0168-v3, Jul. 24, 2013 (Jul. 24, 2013), XP030114646, pp. 1-10.

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.

Bross B., et al., "High Efficiency Video Coding (HEVC) text specification draft 8", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, Jul. 23, 2012 (Jul. 23, 2012), XP030112947, 260 Pages.

Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012 , 290 pp.

Bross, et al., "WD4: Working Draft 4 of High-Efficiency Video Coding," JCTVC-F803_d2, (JCT-VC) of ITU-T SG16 WP3 and ISO/IEC JTC1/SC291WG11 Joint Collaborative Team on Video Coding, 6th Meeting, Torino, IT, Jul. 14-22, 2011, 226 pp.

Bross et al., "WD5: Working Draft 5 of High-Efficiency Video Coding," JCTVC-G1103, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.

Chen J. et al., "High Efficiency Video Coding (HEVC) Scalable Extension Draft 3", Joint Collaborative Team on Video Coding (Jct-Vc) of ITU-T SG 16 WP 3 and ISO/IEC JTC 1/SC 29/WG 11, Doc. JCTVC-N1008_v3, 14th Meeting, Vienna, AT, Jul. 25-Aug. 2, 2013, 68 pages.

Chen J., et al., "SHVC Draft Text 1", Joint Collaborative Team on Video Coding (JCT-VC) of ITU-T SG16 WP3 and ISO/IEC JTC1/SC29/WG11, 12th Meeting: Geneva, CH, JCTVC-L1008, Jan. 14-23, 2013, pp. 1-34.

Chen J., et al., "SHVC Test Model 1 (SHM 1)," 12. JCT-VC Meeting; 103. MPEG Meeting; Jan. 14, 2013-Jan. 23, 2013; Geneva; (Joint collaborative team on video coding of ISO/IEC JTC1/SC29/WG11 and ITU-T SG.16); URL: http://wftp3.itu.int/av-arch/jctvc-site/ No. JCTVC-L1007, Feb. 15, 2013 (Feb. 15, 2013), 42 pages, XP030113952, the whole Document.

Han W.J., et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

He Y., et al., "Non-SCE4/AHG14: Combined bit-depth and color gamut conversion with 3D LUT for SHVC color gamut scalability", 15. JCT-VC Meeting; Oct. 23, 2013-Nov. 10, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-O0161-v4, Oct. 24, 2013 (Oct. 24, 2013), XP030115186, pp. 1-7.

International Search Report and Written Opinion—PCT/US2014/070932—ISA/EPO—dated Mar. 12, 2015.

ITU-R Recommendation BT.2020 "Parameter Values for UHDTV systems for Production and International Programme Exchange" Aug. 2012, 7 pp.

ITU-R Recommendation BT.2020-2, "Parameter values for UHDTV systems for production and international programme exchange," Oct. 2015, 8 pages.

ITU-R Recommendation BT.709, "Parameter Values for the HDTV Standards for Production and International programme Exchange," Apr. 2002, 32 pp.

(56) References Cited

OTHER PUBLICATIONS

ITU-R Recommendation BT.709-6, "Parameter values for the HDTV standards for production and international programme exchange," Jun. 2015, pp. 1-17.

ITU-T H.264, Series H: Audiovisual and Multimedia Systems, Infrastructure of audiovisual services—Coding of moving video, Advanced video coding for generic audiovisual services, The International Telecommunication Union, Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

ITU-T H.265, Series H: Audiovisual and Multimedia Systems, Infrastructure of audiovisual services—Coding of moving video, High efficiency video coding, The International Telecommunication Union, Apr. 2015, 634 pp.

ITU-T H.265, Series H: Audiovisual and Multimedia Systems, Infrastructure of audiovisual services—Coding of moving video, High efficiency video coding, The International Telecommunication Union, Oct. 2014, 540 pp.

JCT-VC, "High Efficiency Video Coding (HEVC) text specification draft 10", Jan. 14-23, 2013, 310 pp.

Kerofsky L., et al., "Color Gamut Scalable Video Coding", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-L0334, Jan. 8, 2013 (Jan. 8, 2013), pp. 1-17, XP030113822, abstract sections 1, 2.1, 3, 4, 6 figure 1.

Li X., et al., "Non-SCE1: Asymmetric 3D LUT for Color Gamut Scalability", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0063, Jan. 3, 2014 (Jan. 3, 2014), XP030115531, pp. 1-7.

Li X., et al., "Non-SCE1: Asymmetric 3D LUT for Color Gamut Scalability", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0063-v2, Jan. 9, 2014 (Jan. 9, 2014), XP030115532 pp. 1-7.

Li X., et al., "Non-SCE4: Weighted Prediction Based Color Gamut Scalability," 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-O0180, Oct. 15, 2013 (Oct. 15, 2013), XP030115215, 5 pages.

Philippe B., et al., "Color Gamut Scalable Video Coding for SHVC", 2013 Picture Coding Symposium (PCS), IEEE, Dec. 8, 2013 (Dec. 8, 2013), pp. 301-304, XP032567015, DOI: 10.1109/PCS.2013.6737743 [retrieved on Feb. 11, 2014].

Second Written Opinion from International Application No. PCT/US2014/070932, dated Nov. 11, 2015, 9 pp.

Sjoberg R., et al., "Overview of HEVC High-Level Syntax and Reference Picture Management," IEEE Transactions on Circuits and Systems for Video Technology, vol. 22 (12), XP011487804, Dec. 2012, pp. 1858-1870.

Tech, et al., "3D-HEVC Draft Text 1", JCT-3V Meeting; MPEG Meeting; Jul. 27-Aug. 2, 2013; (The Joint Collaborative Team on 3D Video Coding Extension Development of ISO/IEC JTC1/SC29/WG11 and ITU-T SG.16); No. JCT3V-E1001_v3, XP030130664, 89 pp.

Tech G., et al., "MV-HEVC Draft Text 5", Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Jul. 27-Aug. 2, 2013, 65 pages.

Wang Y-K., et al., "High Efficiency Video Coding (HEVC) Defect Report", 14. JCT-VC Meeting; Jul. 25, 2013-Aug. 2, 2013; Vienna; (Joint Collaborative Team on Video Coding of ISO/IEC JTC1/SC29/WG11 and ITU-TSG.16 ); URL: http://wftp3.itu.int/av-arch/jctvc-site/,,No. JCTVC-N1003, Sep. 27, 2013 (Sep. 27, 2013), XP030114947, 311 pages.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.

Wiegand, T., et al., "WD3: Working Draft 3 of High-Efficiency Video Coding," Document JCTVC-E603, 5th Meeting: Geneva, CH, Mar. 16-23, 2011, 160 pages.

Wiegand T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Response to Written Opinion dated Mar. 12, 2015, from International Applicaiton No. PCT/US2014/070932, filed on Oct. 16, 2015, 6 pp.

Response to Second Written Opinion dated Nov. 11, 2015, from International Application No. PCT/US2014/070932, filed Jan. 11, 2016, 5 pp.

International Preliminary Report on Patentability from International Application No. PCT/US2014/070932, dated Feb. 1, 2016, 10 pp.

U.S. Appl. No. 15/654,558, filed by Xiang Li, et al., filed Jul. 19, 2017.

U.S. Appl. No. 15/654,574, filed by Xiang Li, et al., filed Jul. 19, 2017.

Ishii A., et al., "Color Space Conversion for the Laser Film Recorder using 3-D LUT", SMPTE Motion Imaging, Nov. 2002, pp. 525-532.

Mou W., et al., "Fast Search Algorithm of Nonlinear LUT based on K-D Tree", International Conference on Computer Sciences and Applications, Dec. 2013, pp. 281-284.

Bordes P., et al., AHG14: Color Gamut Scalable Video Coding using 3D LUT, Joint Collaborative Team on Video Coding (JCT-VC) 13th Meeting: Incheon, JCTVC-M0197-v3.zip, Apr. 17, 2013, JCTVC-M0197_v3.docx, 10 pages.

Park J.H., et al., Requirement of Color Space Scalability, Joint Video Team (JVT) 25th Meeting: Shenzhen, JVT-Y076.zip, Oct. 24, 2007, JVT-Y076.doc, 10 pp.

\* cited by examiner

SIGNALING COLOR VALUES FOR 3D LOOKUP TABLE FOR COLOR GAMUT SCALABILITY IN MULTI-LAYER VIDEO CODING

RELATED APPLICATIONS

This application is a continuation of U.S. application Ser. No. 14/572,002, filed Dec. 16, 2014, which claims the benefit of U.S. Provisional Application No. 61/917,228, filed Dec. 17, 2013, and U.S. Provisional Application No. 62/005,845, filed May 30, 2014, the contents of each of which are hereby incorporated by reference in their entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for signaling information used to generate three-dimensional (3D) color lookup tables for color gamut scalability in multi-layer video coding. Color prediction techniques for color gamut scalability may be used by video encoders and/or video decoders to generate inter-layer reference pictures when a color gamut for a lower layer of video data is different than a color gamut for a higher layer of the video data. For example, a video encoder and/or video decoder may first perform color prediction using a 3D lookup table for color gamut scalability to convert the color data of a reference picture for the lower layer to the color gamut for the higher layer, and then generate inter-layer reference pictures based on the converted color data. According to the techniques described in this disclosure, a video encoder may encode partition information and/or color values of a 3D lookup table generated for color gamut scalability. A video decoder may decode the partition information and/or color values to generate the 3D lookup table in order to perform color gamut scalability.

In one example, this disclosure is directed toward a method of decoding video data, the method comprising determining a base partition value for a three-dimensional (3D) lookup table for color gamut scalability; determining a luma partition value for a luma component of the 3D lookup table; and generating the 3D lookup table with coarser partitioning for chroma components and finer partitioning for the luma component, including partitioning each of the luma component, a first chroma component and a second chroma component of the 3D lookup table into a first number of octants based on the base partition value, and partitioning each of the first number of octants of the luma component into a second number of octants based on the luma partition value.

In another example, this disclosure is directed toward a method of encoding video data, the method comprising generating a three-dimensional (3D) lookup table for color gamut scalability with coarser partitioning for chroma components and finer partitioning for a luma component, including partitioning each of the luma component, a first chroma component and a second chroma component of the 3D lookup table into a first number of octants based on a base partition value for the 3D lookup table, and partitioning each of the first number of octants of the luma component into a second number of octants based on a luma partition value for the luma component of the 3D lookup table.

In a further example, this disclosure is directed toward a video decoding device comprising a memory configured to store video data; and one or more processors in communication with the memory. The one or more processors are configured to determine a base partition value for a three-dimensional (3D) lookup table for color gamut scalability of the video data, determine a luma partition value for a luma component of the 3D lookup table, and generate the 3D lookup table with coarser partitioning for chroma components and finer partitioning for the luma component, the one or more processors configured to partition each of the luma component, a first chroma component and a second chroma component of the 3D lookup table into a first number of octants based on the base partition value, and partition each of the first number of octants of the luma component into a second number of octants based on the luma partition value.

In another example, this disclosure is directed toward a video encoding device comprising a memory configured to store video data; and one or more processors in communication with the memory. The one or more processors are configured to generate a three-dimensional (3D) lookup table for color gamut scalability of the video data with coarser partitioning for chroma components and finer partitioning for a luma component, the one or more processors configured to partition each of the luma component, a first chroma component and a second chroma component of the 3D lookup table into a first number of octants based on a base partition value, and partition each of the first number of octants of the luma component into a second number of octants based on a luma partition value for the luma component of the 3D lookup table.

In an additional example, this disclosure is directed toward a video decoding device comprising means for determining a base partition value for a three-dimensional (3D) lookup table for color gamut scalability; means for determining a luma partition value for a luma component of the 3D lookup table; and means for generating the 3D lookup table with coarser partitioning for chroma components and finer partitioning for the luma component, including means for partitioning each of the luma component, a first chroma component and a second chroma component of the 3D lookup table into a first number of octants based on the base partition value, and means for partitioning each of the first number of octants of the luma component into a second number of octants based on the luma partition value.

In a further example, this disclosure is directed toward a computer-readable storage medium storing instructions for decoding video data that, when executed, cause one or more processors to determine a base partition value for a three-dimensional (3D) lookup table for color gamut scalability; determine a luma partition value for a luma component of the 3D lookup table; and generate the 3D lookup table with coarser partitioning for chroma components and finer partitioning for the luma component, the instructions cause the one or more processors to partition each of the luma component, a first chroma component and a second chroma component of the 3D lookup table into a first number of octants based on the base partition value, and partition each of the first number of octants of the luma component into a second number of octants based on the luma partition value.

In another example, this disclosure is directed toward a method of decoding video data, the method comprising determining a number of octants for each of three color components of a three-dimensional (3D) lookup table for color gamut scalability; for each of the octants for each of the color components, decoding color mapping coefficients for a linear color mapping function of color values in the 3D lookup table used to convert color data in a first color gamut for a lower layer of the video data to a second color gamut for a higher layer of the video data; and generating the 3D lookup table based on the number of octants for each of the color components and color values associated with the color mapping coefficients for each of the octants.

In a further example, this disclosure is directed toward a method of encoding video data, the method comprising generating a three-dimensional (3D) lookup table for color gamut scalability based on a number of octants for each of three color components and color values for each of the octants; and for each of the octants for each of the color components, encoding color mapping coefficients for a linear color mapping function of the color values in the 3D lookup table used to convert color data in a first color gamut for a lower layer of the video data to a second color gamut for a higher layer of the video data.

In an additional example, this disclosure is directed toward a video decoding device comprising a memory configured to store video data; and one or more processors in communication with the memory. The one or more processors are configured to determine a number of octants for each of three color components of a three-dimensional (3D) lookup table for color gamut scalability of the video data, for each of the octants for each of the color components, decode color mapping coefficients for a linear color mapping function of color values in the 3D lookup table used to convert color data in a first color gamut for a lower layer of the video data to a second color gamut for a higher layer of the video data, and generate the 3D lookup table based on the number of octants for each of the color components and color values associated with the color mapping coefficients for each of the octants.

In a further example, this disclosure is directed toward a video encoding device comprising a memory configured to store video data; and one or more processors in communication with the memory. The one or more processors are configured to generate a three-dimensional (3D) lookup table for color gamut scalability of the video data based on a number of octants for each of three color components and color values for each of the octants; and for each of the octants for each of the color components, encode color mapping coefficients for a linear color mapping function of the color values in the 3D lookup table used to convert color data in a first color gamut for a lower layer of the video data to a second color gamut for a higher layer of the video data.

In another example, this disclosure is directed toward a video decoding device comprising means for determining a number of octants for each of three color components of a three-dimensional (3D) lookup table for color gamut scalability; means for decoding, for each of the octants for each of the color components, color mapping coefficients for a linear color mapping function of color values in the 3D lookup table used to convert color data in a first color gamut for a lower layer of the video data to a second color gamut for a higher layer of the video data; and means for generating the 3D lookup table based on the number of octants for each of the color components and color values associated with the color mapping coefficients for each of the octants.

In an additional example, this disclosure is directed toward a computer-readable storage medium storing instructions for decoding video data that, when executed, cause one or more processors to determine a number of octants for each of three color components of a three-dimensional (3D) lookup table for color gamut scalability; for each of the octants for each of the color components, decode color mapping coefficients for a linear color mapping function of color values in the 3D lookup table used to convert color data in a first color gamut for a lower layer of the video data to a second color gamut for a higher layer of the video data; and generate the 3D lookup table based on the number of octants for each of the color components and color values associated with the color mapping coefficients for each of the octants.

The details of one or more examples are set forth in the accompanying drawings and the description below. Other features, objects, and advantages will be apparent from the description and drawings, and from the claims.

DETAILED DESCRIPTION

Figure 1:
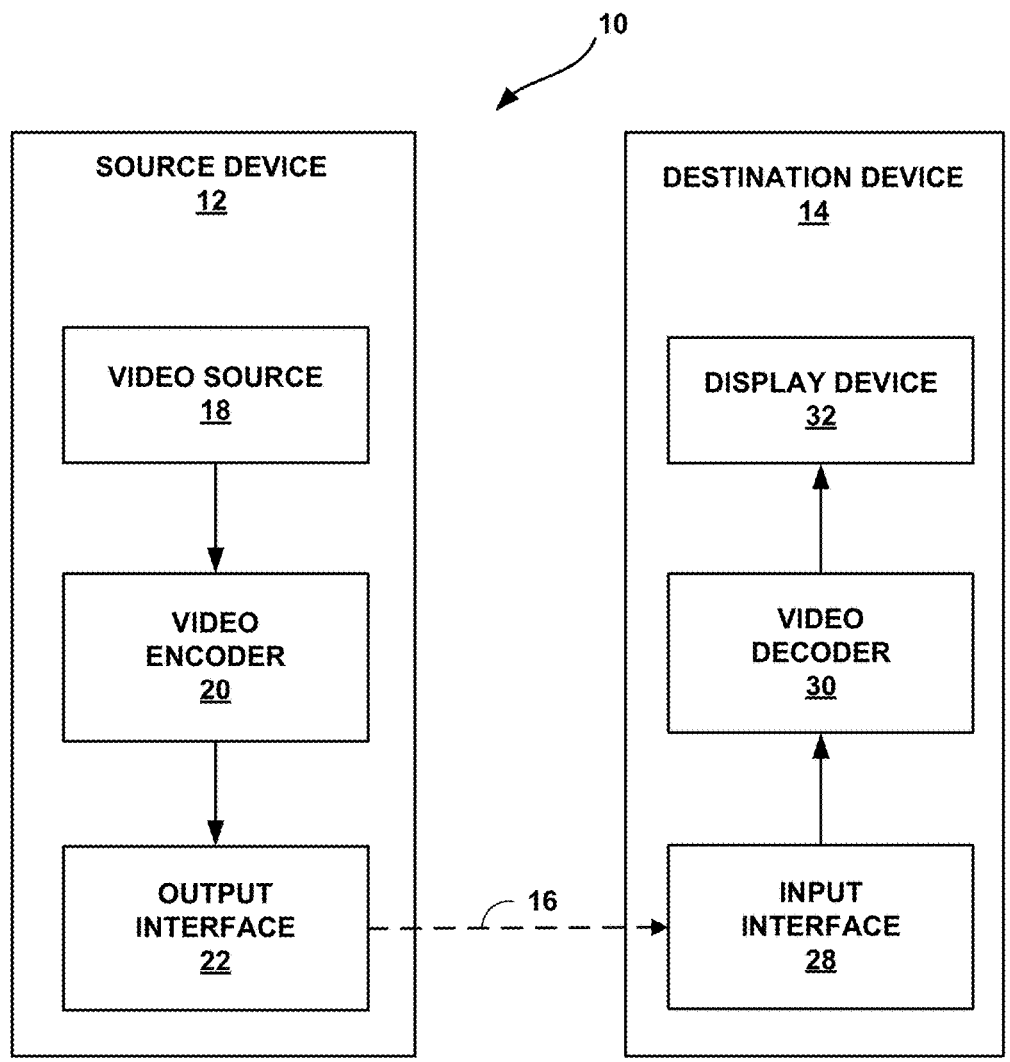
FIG. 1 is a block diagram illustrating an example video encoding and decoding system that may utilize techniques for 3D lookup table based color gamut scalability.

This disclosure describes techniques for three-dimensional (3D) color prediction for color gamut scalability in multi-layer video coding. The multi-layer video coding may be in accordance the High Efficiency Video Coding (HEVC) standard, including any of a scalable video coding extension, a multiview video coding extension, a 3D video coding (i.e., multiview video coding plus depth) extension, or other multi-layer video coding extensions to HEVC. The techniques may be used by video encoders and/or video decoders to generate inter-layer reference pictures when a color gamut for a lower layer of video data is different than a color gamut for a higher layer of the video data. In some examples, the techniques may also be used when a bit depth of the lower layer of video data is different than a bit depth for the higher layer of the video data.

A color gamut comprises a complete range of colors that can be reproduced for an image, e.g., in a picture, slice, block or layer of video data. Conventionally, in multi-layer video coding, a lower layer of video data (e.g., a base layer) and a higher layer of the video data (e.g., an enhancement layer) include color data in the same color gamut, e.g., high definition (HD) color gamut BT.709. In this case, a video encoder and/or video decoder may generate inter-layer reference pictures for the higher layer of the video data as up-sampled versions of co-located reference pictures for the lower layer of the video data.

In some examples, however, a lower layer of video data may include color data in a first color gamut, e.g., BT.709, and a higher layer of the video data may include color data in a different, second color gamut, e.g., ultra-high definition (UHD) color gamut BT.2020. In this example, in order to generate inter-layer reference pictures for the higher layer of the video data, a video encoder and/or video decoder must first perform color prediction to convert the color data of a reference picture in the first color gamut for the lower layer of the video data to the second color gamut for the higher layer of the video data.

The video encoder and/or video decoder may perform color prediction using a 3D lookup table for color gamut scalability. In some examples, a separate 3D lookup table may be generated for each of the color components, i.e., a luma (Y) component, a first chroma (U) component and a second chroma (V) component. Each of the 3D lookup tables includes a luma (Y) dimension, a first chroma (U) dimension and a second chroma (V) dimension, and is indexed using the three independent color components (Y, U, V).

Conventionally, the 3D lookup tables are always symmetric such that the 3D lookup tables have a same size for the luma component, the first chroma component and the second chroma component. In addition, conventionally, the 3D lookup tables are always balanced such that a size of each dimension of the 3D lookup tables is always the same. This may result in large table sizes with high computational complexity and high signaling costs. For example, table sizes may be up to 9×9×9 or 17×17×17.

In U.S. patent application Ser. No. 14/512,177, filed Oct. 10, 2014, techniques are described that enable a video encoder and/or video decoder to generate an asymmetric and/or unbalanced 3D lookup table such that the 3D lookup table has a size that is different for the luma component than for the first chroma component and the second chroma component. The video encoder and/or video decoder may generate this asymmetric and/or unbalanced 3D lookup table by partitioning the luma component into a different number of segments than the first and second chroma components. In this example, table sizes may be up to 8×2×2.

The techniques of this disclosure are directed toward signaling of information used to generate 3D lookup tables for color gamut scalability. According to the techniques, a video encoder may encode partition information and/or color values of a 3D lookup table generated for color gamut scalability. A video decoder may decode the partition information and/or color values to generate the 3D lookup table in order to perform color gamut scalability. The techniques described in this disclosure may be particularly useful in signaling the information used to generate asymmetric and/or unbalanced 3D lookup tables.

In one example of the disclosed techniques, a video decoder and/or video encoder may generate a 3D lookup table with coarser partitioning for first and second chroma components and finer partitioning for a luma component by partitioning each of the color components into a number of octants according to a base partition value, e.g., a maximal split depth for the 3D lookup table, and then further partitioning each of the octants of the luma component based on a luma partition value. In this way, the chroma components of the 3D lookup table are partitioned into fewer octants (i.e., coarser partitioned) and the luma component of the 3D lookup table is partitioned into more octants (i.e., finer partitioned).

In one example, the luma partition value may be signaled in a bitstream by the video encoder to the video decoder. In other examples, the base partition value may also be signaled in the bitstream by the video encoder to the video decoder. In other cases, the luma partition value may be derived by both the video encoder and the video decoder and/or the base partition value may be a predefined value known at both the video encoder and the video decoder.

As an example, the base partition value is equal to 1 such that each of the first chroma, second chroma, and luma color components is partitioned into a single octant, and the luma partition value is equal to 4 such that the single octant of the luma component is partitioned into four octants, which results in a 3D lookup table of size 4×1×1. As another example, the base partition value is equal to 2 such that each of the first chroma, second chroma, and luma color components is partitioned into two octants, and the luma partition value is equal to 4 such that each of the two octants of the luma component is partitioned into four octants, which results in a 3D lookup table of size 8×2×2. As can be seen, a lower partition value results in a coarser partitioning (i.e., a smaller number of octants) for a color component.

According to the techniques, each of the color components may be partitioned into one or more octants based on one or more of the base partition value or the luma partition value. In this disclosure, the term "octant" is defined as a three dimensional region that includes eight vertexes. In this disclosure, the terms "partition," "octant," "segment," and "cuboid," may be used interchangeably to describe the partitioned regions of the color components of the 3D lookup table.

In addition, based on at least one of the first or second chroma components of the 3D lookup table being partitioned into more than one octant, i.e., the base partition value being greater than one, the video encoder may signal a partitioning boundary for the one of the chroma components to the video decoder. The partitioning boundary defines an uneven partitioning of the one of the chroma components into two or more octants. In other words, one or both of the chroma components may not be partitioned into two or more even or equally sized octants. In this case, for a given one of the chroma components, at least one of the octants has a different size than the one or more other octants. According to the techniques of this disclosure, the video encoder only signals the partitioning boundary based on the condition that one of the chroma components is partitioned into more than one octant. Otherwise, the partition boundary is unnecessary and is not signaled to the video decoder.

In another example of the disclosed techniques, a video encoder and/or a video decoder may generate a 3D lookup table based on a number of octants for each of the luma, first chroma, and second chroma color components, and color values for each of the octants. As described above, in some cases, the number of octants for at least one of the color components of the 3D lookup table may also be signaled by the video encoder to the video decoder. In order for the video decoder to determine the color values in the 3D lookup table, color mapping coefficients for a linear color mapping function of the color values in the 3D lookup table are signaled by the video encoder to the video decoder. The linear color mapping function is used to convert color data in a first color gamut for a lower layer of video data to a second color gamut for a higher layer of video data, and the color mapping coefficients are weighting factors between color components of the lower and higher layers of the video data. For each of the color components, one of the color mapping coefficients may be a key coefficient that defines a weighting factor between the same color component of the lower and higher layers of the video data.

The color mapping coefficients of the linear color mapping function are derived as floating point values. Before signaling the color mapping coefficients in a bitstream, the floating point values may be converted to integer values. Although integer values may be less accurate than floating point values, the integer values are easier to signal and integer operations are less computationally expensive than floating point operations. The conversion may use a bit-depth for the integer values based at least one of an input bit-depth or an output bit-depth of the 3D lookup table. In addition, the values of the color mapping coefficients may be restricted to be within a given range based on a predefined fixed value or a value dependent on at least one of an input bit-depth or an output bit-depth of the 3D lookup table.

One or more of the color mapping coefficients may be predicted such that residual values between original values of the color mapping coefficients and predicted values of the color mapping coefficients are encoded in the bitstream. For example, for a first octant for each of the color components, the color mapping coefficients of the linear color mapping function may be predicted based on predefined fixed values. In one example, a key coefficient of the linear color mapping function may be predicted based on a predicted value equal to a predefined non-zero value, and any remaining color mapping coefficients may be predicted based on a predicted value equal to zero. In this example, the color mapping coefficients of any remaining octants for each of the color components may be predicted based on predicted values from at least one previous octant, such as the first octant. In some cases, the residual values of the color mapping coefficients may be quantized based on a determined quantization value. The video encoder may signal the determined quantization value for the video decoder to perform inverse quantization to properly decode the color mapping coefficients.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

The design of a new video coding standard, namely HEVC, has been finalized by the Joint Collaboration Team on Video Coding (JCT-VC) of ITU-T Video Coding Experts Group (VCEG) and ISO/IEC Motion Picture Experts Group (MPEG). An HEVC draft specification referred to as HEVC Working Draft 10 (WD10), Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003v34, is available from http://phenix.int-evry.fr/jct/doc_end_user/documents/12_Geneva/wg11/ JCTVC-L1003-v34.zip. The finalized HEVC standard is referred to as HEVC version 1.

A defect report, Wang et al., "High efficiency video coding (HEVC) Defect Report," Joint Collaborative Team on Video Coding (JCT-VC) of ITU-T SG16 WP3 and ISO/IEC JTC1/SC29/WG11, 14th Meeting: Vienna, AT, 25 Jul.-2 Aug. 2013, JCTVC-N1003v1, is available from http://phenix.int-evry.fr/jct/doc_end_user/documents/14_Vienna/wg11/JCTVC-N1003-v1. zip. The finalized HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2013.

The multi-view extension to HEVC (MV-HEVC) and another HEVC extension for more advanced 3D video coding (3D-HEVC) are being developed by the JCT-3V. A draft specification of MV-HEVC, referred to as MV-HEVC Working Draft 5 (WD5), Tech et al., "MV-HEVC Draft Text 5," Joint Collaborative Team on 3D Video Coding Extension Development (JCT-3V) of ITU-T SG16 WP3 and ISO/IEC JTC1/SC29/WG11, 5th Meeting: Vienna, AT, 27 Jul.-2 Aug. 2013, JCT3V-E1004v6, is available from http://phenix.int-evry.fr/jct/doc_end_user/documents/5_Vienna/wg11/ JCT3V-E1004-v6.zip. A draft specification of 3D-HEVC, referred to as 3D-HEVC Working Draft 1 (WD1) and described in Tech et al., "3D-HEVC Draft Text 1," Joint Collaborative Team on 3D Video Coding Extension Development (JCT-3V) of ITU-T SG 16 WP 3 and ISO/IEC JTC 1/SC 29/WG 11, 5th Meeting: Vienna, AT, 27 Jul.-2 Aug. 2013, JCT3V-E1001v3, is available from http://phenix.it-sudparis.eu/jct2/doc_end_user/documents/5_Vienna/wg11/ JCT3V-E1001-v3.zip.

The scalable extension to HEVC (SHVC) is being developed by the JCT-VC. A draft specification of SHVC, referred to as SHVC Working Draft 3 (WD3), Chen et al., "SHVC Draft 3," Joint Collaborative Team on Video Coding (JCT-VC) of ITU-T SG16 WP3 and ISO/IEC JTC1/SC29/WG11, 14th Meeting: Vienna, AT, 25 Jul.-2 Aug. 2013, JCTVC-N1008v3, is available from http://phenix.int-evry.fr/jct/doc_end_user/documents/14_Vienna/wg11/JCTVC-N1008-v3.zip.

FIG. 1 is a block diagram illustrating an example video encoding and decoding system 10 that may utilize techniques for 3D lookup table based color gamut scalability. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for processing video data in parallel. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual.

In the example of FIG. 1, video encoder 20 and video decoder 30 may operate according to the High Efficiency Video Coding (HEVC) standard finalized by the Joint Collaboration Team on Video Coding (JCT-VC) of ITU-T Video Coding Experts Group (VCEG) and ISO/IEC Motion Picture Experts Group (MPEG). The HEVC draft specification, referenced above, is referred to as HEVC Working Draft 10 (WD10), and the finalized version of the HEVC standard is referred to as HEVC version 1. The MV-HEVC and 3D-HEVC are being developed by the JCT-3V. A recent draft specification of MV-HEVC is referred to as MV-HEVC WD5, and a recent draft specification of 3D-HEVC is referred to as 3D-HEVC WD1. The SHVC is being developed by the JCT-VC. A recent draft specification of SHVC is referred to as SHVC WD3.

In HEVC and other video coding standards, a video sequence typically includes a series of pictures. Pictures may also be referred to as "frames." A picture may include three sample arrays, denoted SL, Scb, and Scr. SL is a two-dimensional array (i.e., a block) of luma samples. Scb is a two-dimensional array of Cb chrominance samples. Scr is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an NxN block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an NxN block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion indicating a spatial displacement between a sample block of the PU and the first reference location and a second motion indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RB SP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

In MV-HEVC, 3D-HEVC, and SHVC, a video encoder may generate a multi-layer bitstream that comprises a series of network abstraction layer (NAL) units. Different NAL units of the bitstream may be associated with different layers of the bitstream. A layer may be defined as a set of video coding layer (VCL) NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In 3D video coding, a layer may contain either all coded depth pictures of a specific view or coded texture pictures of a specific view. Similarly, in the context of scalable video coding, a layer typically corresponds to coded pictures having video characteristics different from coded pictures in other layers. Such video characteristics typically include spatial resolution and quality level (Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. NAL units only encapsulate data of a single layer. In SHVC, a view may be referred to as a "base layer" if a video decoder can decode pictures in the view without reference to data of any other layer. The base layer may conform to the HEVC base specification. Thus, NAL units encapsulating data of the highest remaining layer of the bitstream may be removed from the bitstream without affecting the decodability of data in the remaining layers of the bitstream. In MV-HEVC and 3D-HEVC, higher layers may include additional view components. In SHVC, higher layers may include signal to noise ratio (SNR) enhancement data, spatial enhancement data, and/or temporal enhancement data.

In some examples, data in a higher layer may be decoded with reference to data in one or more lower layers. The lower layers may be used as reference pictures to compress the higher layer using inter-layer prediction. The data of the lower layers may be up-sampled to have the same resolution as the higher layers. In general, video encoder 20 and video decoder 30 may perform inter-layer prediction in a similar manner as inter prediction described above, except one or more up-sampled lower layers may be used as reference pictures as opposed to one or more neighboring pictures.

Figure 2:
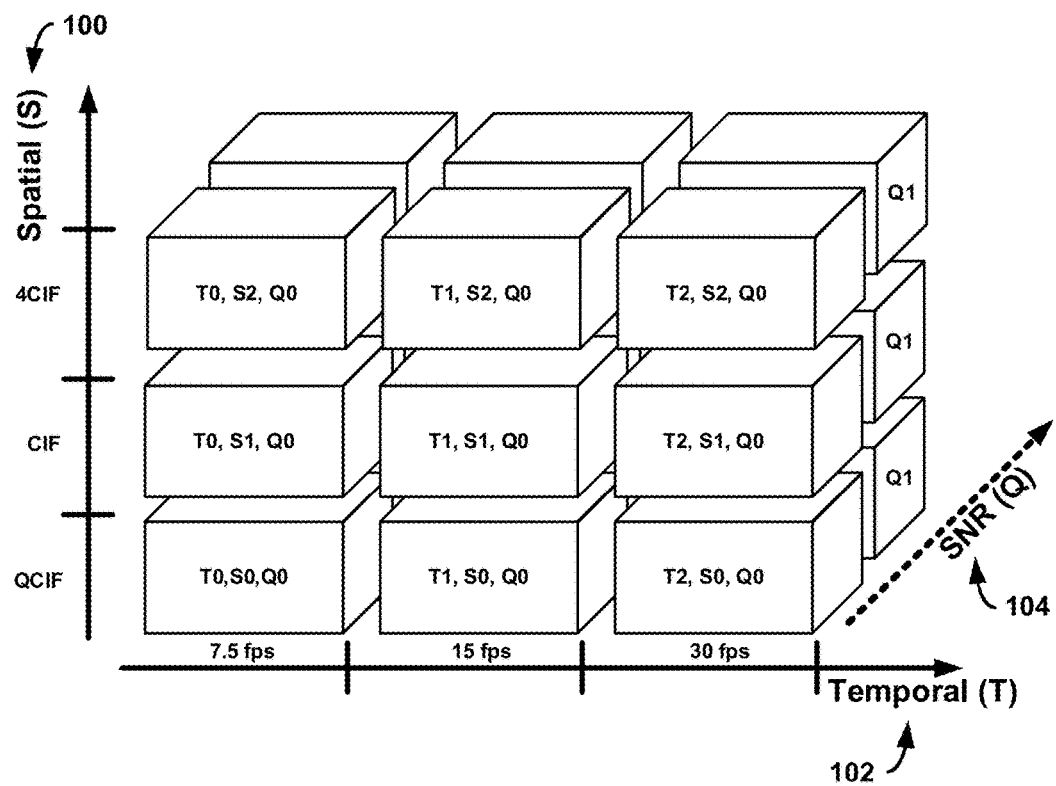
FIG. 2 is a conceptual illustration showing an example of scalability in three different dimensions.

FIG. 2 is a conceptual illustration showing an example of scalability in three different dimensions. In a scalable video coding structure, scalabilities are enabled in three dimensions. In the example of FIG. 2, the scalabilities are enabled in a spatial (S) dimension 100, a temporal (T) dimension 102, and a signal-to-noise ratio (SNR) or quality (Q) dimension 104. In the temporal dimension 102, frame rates with 7.5 Hz (T0), 15 Hz (T1) or 30 Hz (T2), for example, may be supported by temporal scalability. When spatial scalability is supported, different resolutions such as QCIF (S0), CIF (S1) and 4CIF (S2), for example, are enabled in the spatial dimension 100. For each specific spatial resolution and frame rate, SNR layers (Q1) can be added in the SNR dimension 104 to improve the picture quality.

Once video content has been encoded in such a scalable way, an extractor tool may be used to adapt the actual delivered content according to application requirements, which are dependent e.g., on the clients or the transmission channel. In the example shown in FIG. 2, each cubic contains pictures with the same frame rate (temporal level), spatial resolution, and SNR layers. Better representation may be achieved by adding cubes (i.e., pictures) in any of dimensions 100, 102 or 104. Combined scalability is supported when there are two, three or even more scalabilities enabled.

In scalable video coding standards, such as the SVC extension to H.264 or SHVC, the pictures with the lowest spatial and SNR layer are compatible with the single layer video codec, and the pictures at the lowest temporal level form the temporal base layer, which may be enhanced with pictures at higher temporal levels. In addition to the base layer, several spatial and/or SNR enhancement layers may be added to provide spatial and/or quality scalabilities. Each spatial or SNR enhancement layer itself may be temporally scalable, with the same temporal scalability structure as the base layer. For one spatial or SNR enhancement layer, the lower layer it depends on may be referred as the base layer of that specific spatial or SNR enhancement layer.

Figure 3:
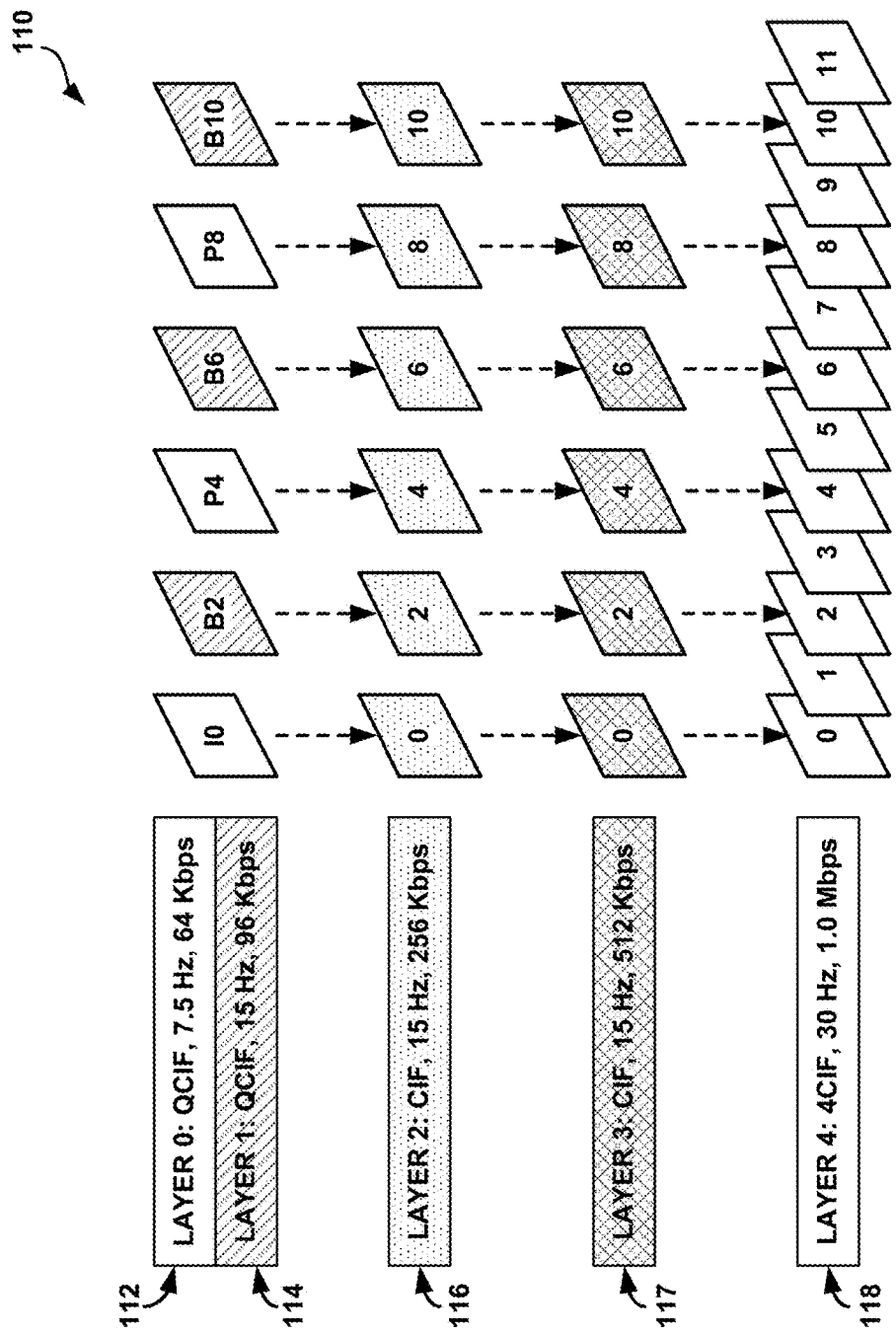
FIG. 3 is a conceptual illustration showing an example structure of a scalable video coding bitstream.

FIG. 3 is a conceptual illustration showing an example structure 110 of a scalable video coding bitstream. The bitstream structure 110 includes a layer 0 112 that includes pictures or slices I0, P4 and P8, and a layer 1 114 that includes pictures or slices B2, B6 and B10. In addition, bitstream structure 110 includes a layer 2 116 and a layer 3 117 that each includes pictures 0, 2, 4, 6, 8 and 10, and a layer 4 118 that includes pictures 0 through 11.

A base layer has the lowest spatial and quality layer (i.e., pictures in layer 0 112 and layer 1 114 with QCIF resolution). Among them, those pictures of the lowest temporal level form the temporal base layer, as shown in layer 0 112 of FIG. 3. The temporal base layer (layer 0) 112 can be enhanced with pictures of a higher temporal level, e.g., layer 1 114 with frame rate of 15 Hz or layer 4 118 with frame rate of 30 Hz.

In addition to the base layer 112, 114, several spatial and/or SNR enhancement layers may be added to provide spatial and/or quality scalabilities. For example, layer 2 116 with CIF resolution may be a spatial enhancement layer to base layer 112, 114. In another example, layer 3 117 may be an SNR enhancement layer to base layer 112, 114 and layer 2 116. As shown in FIG. 3, each spatial or SNR enhancement layer itself may be temporally scalable, with the same temporal scalability structure as the base layer 112, 114. In addition, an enhancement layer may enhance both spatial resolution and frame rate. For example, layer 4 118 provides a 4CIF resolution enhancement layer, which further increases the frame rate from 15 Hz to 30 Hz.

Figure 4:
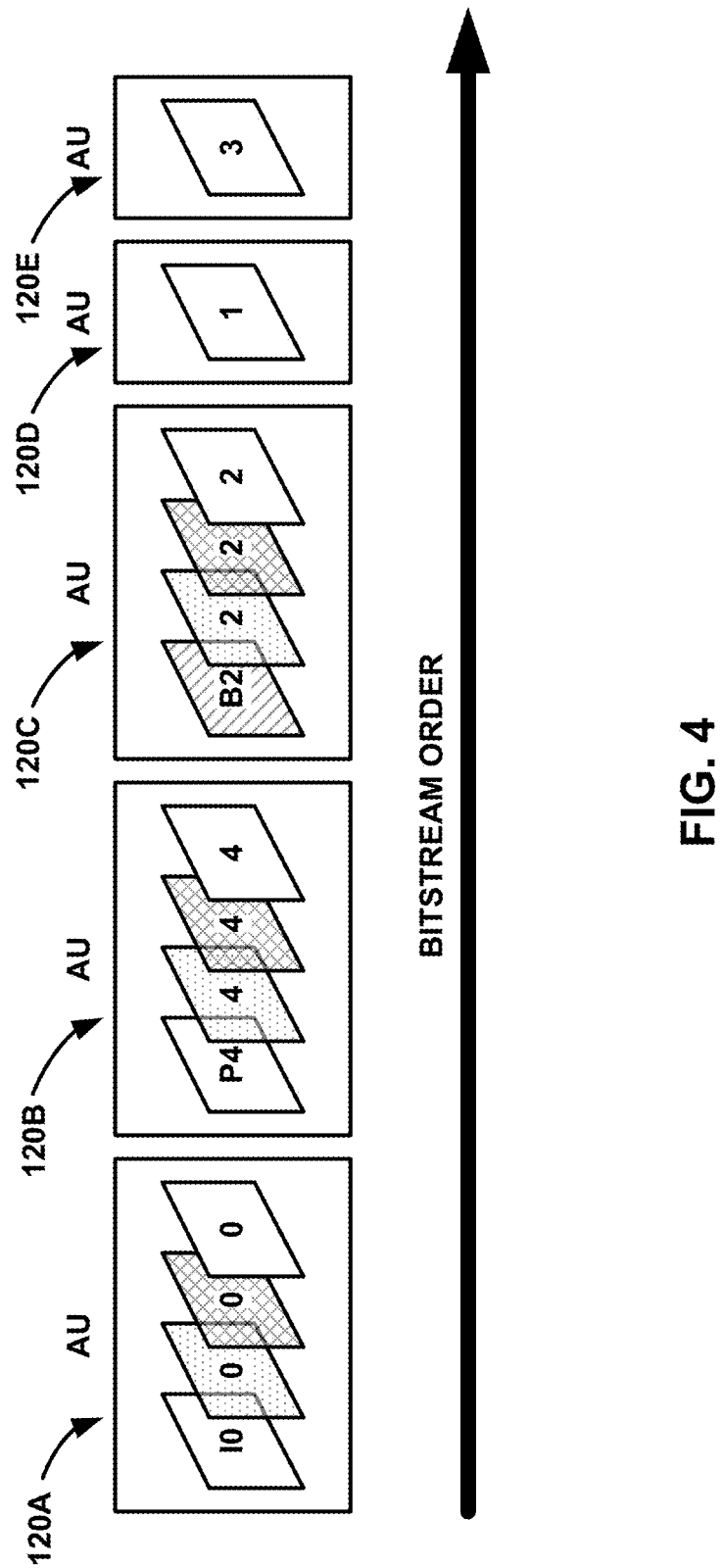
FIG. 4 is a conceptual illustration showing example scalable video coding access units in bitstream order.

FIG. 4 is a conceptual illustration showing example scalable video coding access units 120A-120E ("access units 120") in bitstream order. As shown in FIG. 4, the coded pictures or slices in the same time instance are successive in the bitstream order and form one access unit in the context of a scalable video coding standard, such as the SVC extension to H.264 or SHVC. The access units 120 then follow the decoding order, which could be different from the display order and determined, for example, by the temporal prediction relationship between access units 120.

For example, access unit 120A includes picture I0 from layer 0 112, picture 0 from layer 2 116, picture 0 from layer 3 117, and picture 0 from layer 4 118. Access unit 120B includes picture P4 from layer 0 112, picture 4 from layer 2 116, picture 4 from layer 3 117, and picture 4 from layer 4 118. Access unit 120C includes picture B2 from layer 1 114, picture 2 from layer 2 116, picture 2 from layer 3 117, and picture 2 from layer 4 118. Access unit 120D includes picture 1 from layer 4 118, and access unit 120E includes picture 3 from layer 4 118.

Figure 5:
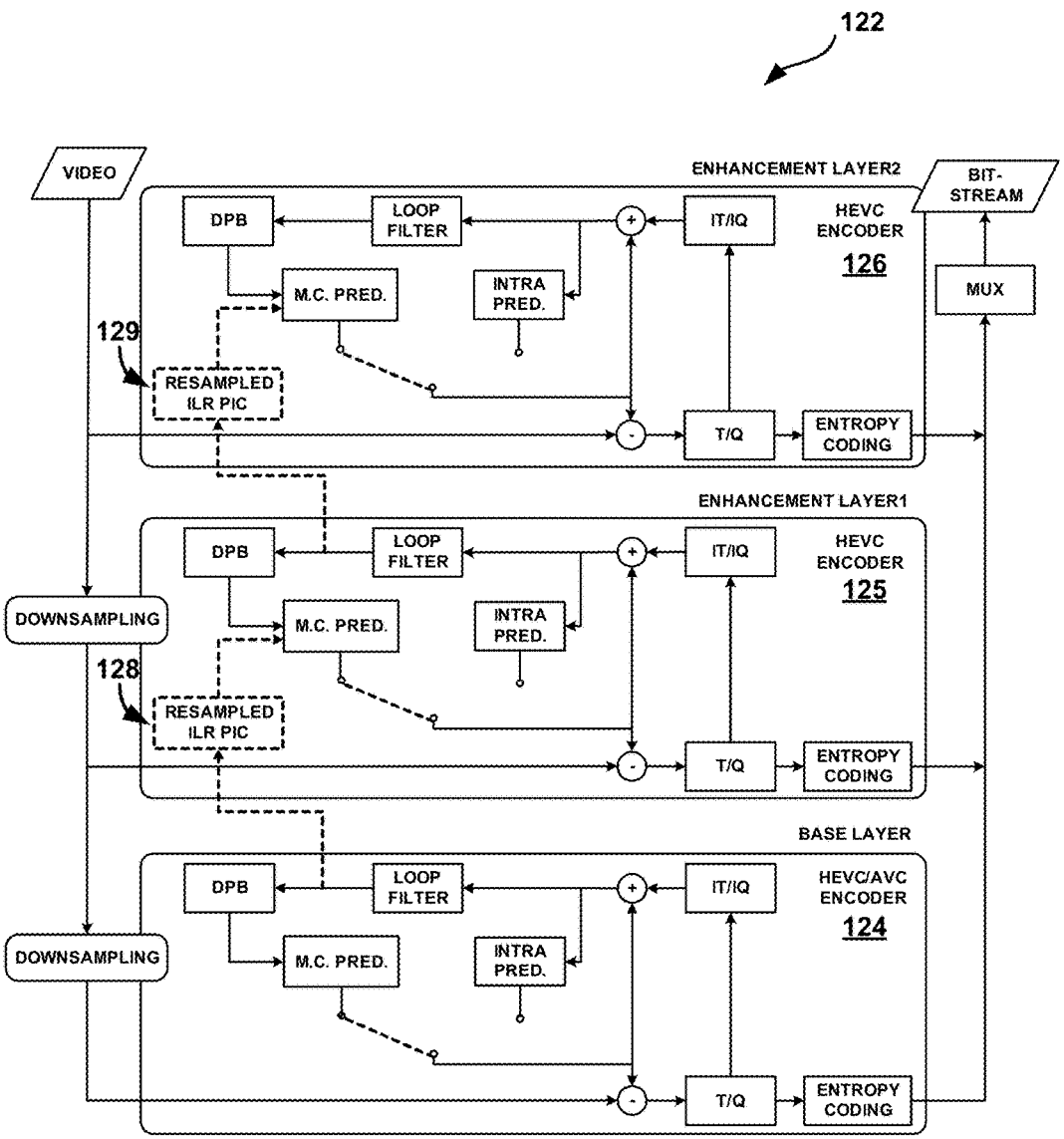
FIG. 5 is a block diagram illustrating an example scalable video coding extension to HEVC (SHVC) encoder.

FIG. 5 is a block diagram illustrating an example 3-layer SHVC encoder 122. As illustrated in FIG. 5, SHVC encoder 122 includes a base layer encoder 124, a first enhancement layer encoder 125 and a second enhancement layer encoder 126. In high-level syntax only SHVC, there are no new block level coding tools when compared to HEVC single layer coding. In SHVC, only slice and above level syntax changes and picture level operation, such as picture filtering or up-sampling, are allowed.

To reduce the redundancy between layers, up-sampled co-located reference layer pictures for a lower/base layer may generated and stored in a reference buffer for a higher/enhancement layer so that inter-layer prediction may be achieved in the same way as inter-frame prediction within a single layer. As illustrated in FIG. 5, a resampled inter-layer reference (ILR) picture 128 is generated from a reference picture in base layer encoder 124 and stored in first enhancement layer encoder 125. Similarly, a resampled ILR picture 129 is generated from a reference picture in first enhancement layer encoder 125 and stored in second enhancement layer encoder 126. In SHVC WD3, the ILR picture is marked as a long term reference picture for the enhancement layer. The motion vector difference associated with an inter-layer reference picture is constrained to zero.

The upcoming deployment of ultra-high definition television (UHDTV) devices and content will use a different color gamut than legacy devices. Specifically, HD uses the BT.709 recommendation, ITU-R Recommendation BT.709 "Parameter values for the HDTV standards for production and international programme exchange" December 2010, while UHDTV will use the BT.2020 recommendation, ITU-R Recommendation BT.2020 "Parameter values for UHDTV systems for production and international programme exchange" April 2012. A color gamut comprises a complete range of colors that can be reproduced for an image, e.g., in a picture, slice, block or layer of video data. A key difference between these systems is that the color gamut of UHDTV is significantly larger than HD. It is asserted that UHDTV will provide a more life-like or realistic viewing experience, which is consistent with other UHDTV characteristics, such as high resolution.

Figure 6:
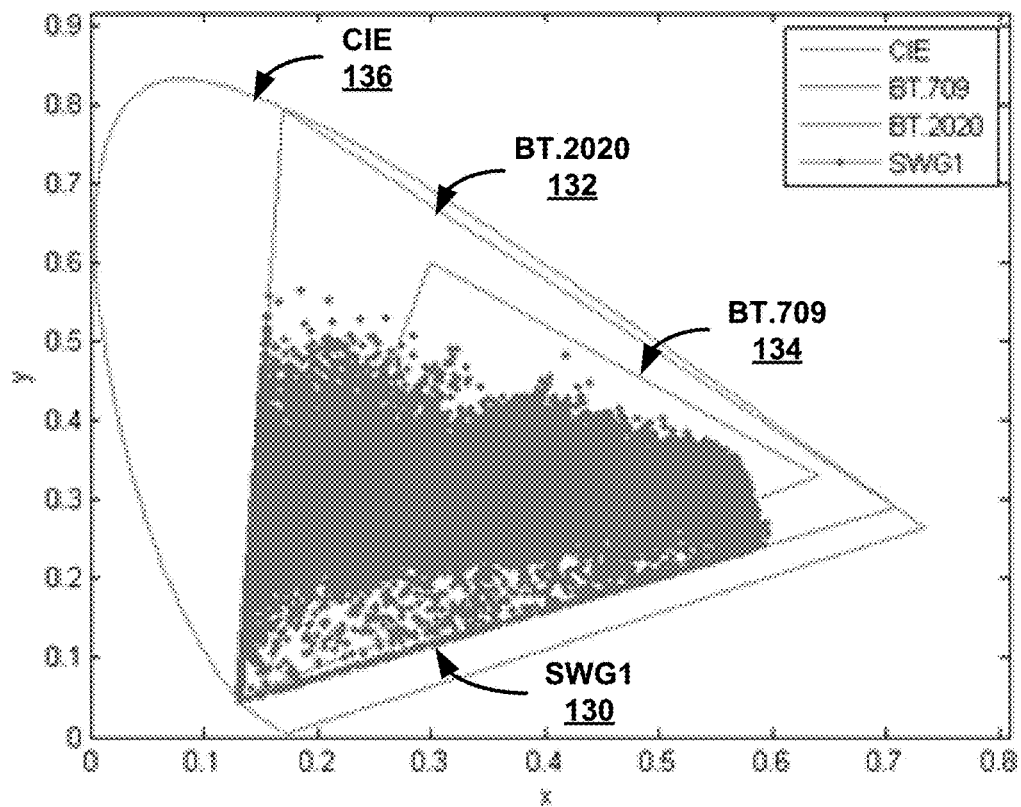
FIG. 6 is a graph illustrating an example color gamut of a sample video sequence.

FIG. 6 is a graph illustrating an example color gamut of a sample video sequence 130. As illustrated in FIG. 6, the SWG1 sample video sequence 130 is indicated as a cluster of dots within a line outline of the UHD color gamut BT.2020 132. For comparison purposes, an outline of the HD color gamut BT.709 134 and an outline of the International Commission on Illumination (CIE)-XYZ linear color space 136 overlays the SWG1 sample video sequence 130. It is easily observed from FIG. 6 that the UHD color gamut BT.2020 132 is much larger than the HD color gamut BT.709 134. Note the number of pixels in the SWG1 sample video sequence 130 that fall outside of the BT.709 color gamut 134.

Figure 7:
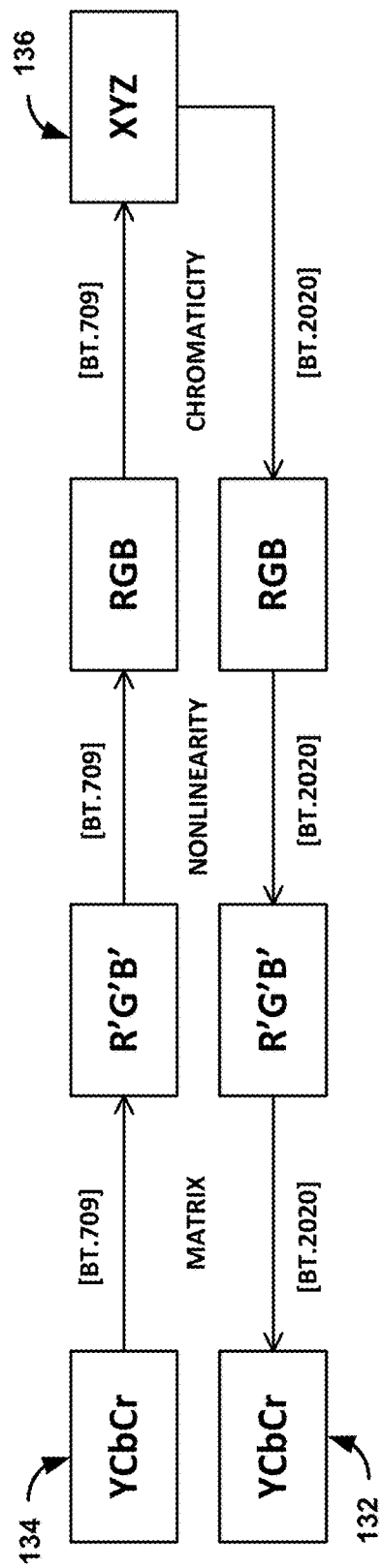
FIG. 7 is a block diagram illustrating conversion from high definition (HD) color gamut BT.709 to ultra-high definition (UHD) color gamut BT.2020.

FIG. 7 is a block diagram illustrating conversion from HD color gamut BT.709 134 to UHD color gamut BT.2020 132. Both the HD color gamut BT.709 134 and the UHD color gamut BT.2020 132 define representations of color pixels in luma and chroma components (e.g., YCbCr or YUV). Each color gamut defines conversion to and from the CIE-XYZ linear color space 136. This common intermediate color space may be used to define the conversion of the luma and chroma values in the HD color gamut BT.709 134 to corresponding luma and chroma values in the UHD color gamut BT.2020 132.

More details regarding the color gamut of the sample sequence illustrated in FIG. 6 and the color gamut conversion illustrated in FIG. 7 may be found in L. Kerofsky, A. Segall, S.-H. Kim, K. Misra, "Color Gamut Scalable Video Coding: New Results," JCTVC-L0334, Geneva, CH, 14-23 Jan. 2013 (hereinafter referred to as "JCTVC-L0334").

Figure 8:
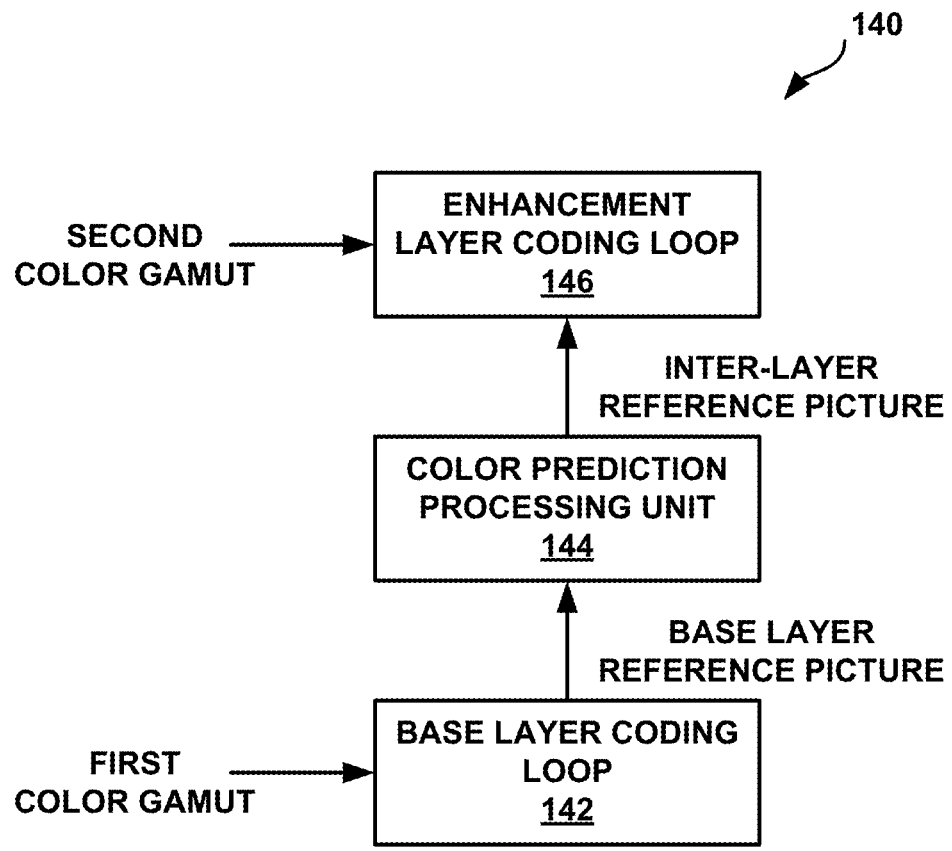
FIG. 8 is a block diagram illustrating a color gamut scalable coder including a color prediction processing unit that may generate an inter-layer reference picture when a base layer color gamut and an enhancement layer color gamut are different.

FIG. 8 is a block diagram illustrating a color gamut scalable coder 140 including a color prediction processing unit 144 that may generate an inter-layer reference picture when a base layer color gamut and an enhancement layer color gamut are different. Color prediction processing unit 144 may be used by a video coder, such as video encoder 20 or video decoder 30 from FIG. 1, to perform color gamut scalable video coding, in which the color gamut of the base and enhancement layer is different.

In the example illustrated in FIG. 8, a base layer coding loop 142 performs video coding of pictures that include color data in a first color gamut, e.g., BT.709, and an enhancement layer coding loop 146 performs video coding of pictures that include color data in a second color gamut, e.g., BT.2020. Color prediction processing unit 144 performs color prediction to map or convert color data of a base layer reference picture in the first color gamut to the second color gamut, and generates an inter-layer reference picture for the enhancement layer based on the mapped color data of the base layer reference picture.

To achieve high coding efficiency, color prediction processing unit 144 is configured to perform specific color prediction when generating inter-layer reference pictures. As described in more detail below, color prediction processing unit 144 may be configured to perform color prediction according to any of a linear prediction model, a piecewise linear prediction model, or a 3D lookup table based color prediction model.

A linear prediction model is proposed in JCTVC-L0334, referenced above. Generally, the color prediction process of the linear prediction model may be described as a gain and offset model. The linear prediction model operates on individual color planes. To facilitate integer calculation, a parameter describes the number of fractional bits used in the calculation using the parameter numFractionBits. For each channel, a gain[c] and offset[c] are specified. The linear prediction model is defined as follows:

Pred[c][x][y]=(gain[c]*In[x][y]+(1<<(numFraction-Bits-1)))>>numFractionBits+offset[c]

A piecewise linear prediction model is proposed in C. Auyeung, K. Sato, "AHG14: Color gamut scalable video coding with piecewise linear predictions and shift-offset model," JCTVC-N0271, Vienna, Austria, July 2013, based on JCTVC-L0334, referenced above. The color prediction process of the piecewise linear prediction model may also be described as a gain and offset model. The piecewise linear prediction model is defined as follows:

Let d[c][x][y]=In[c][x][y]-knot[c].

If d[c][x][y]<=0

Pred[c][x][y]=(gain1[c]*d[c][x][y]+offset[c]+(1<<(numFractionBits-1)))>>numFractionBits else Pred[c][x][y]=(gain2[c]*d[c][x][y]+offset[c]+(1<<(numFractionBits-1)))>>numFractionBits The prediction parameters knot[c], offset[c], gain1[c], and gain2[c] may be encoded in the bitstream.

Figure 9:
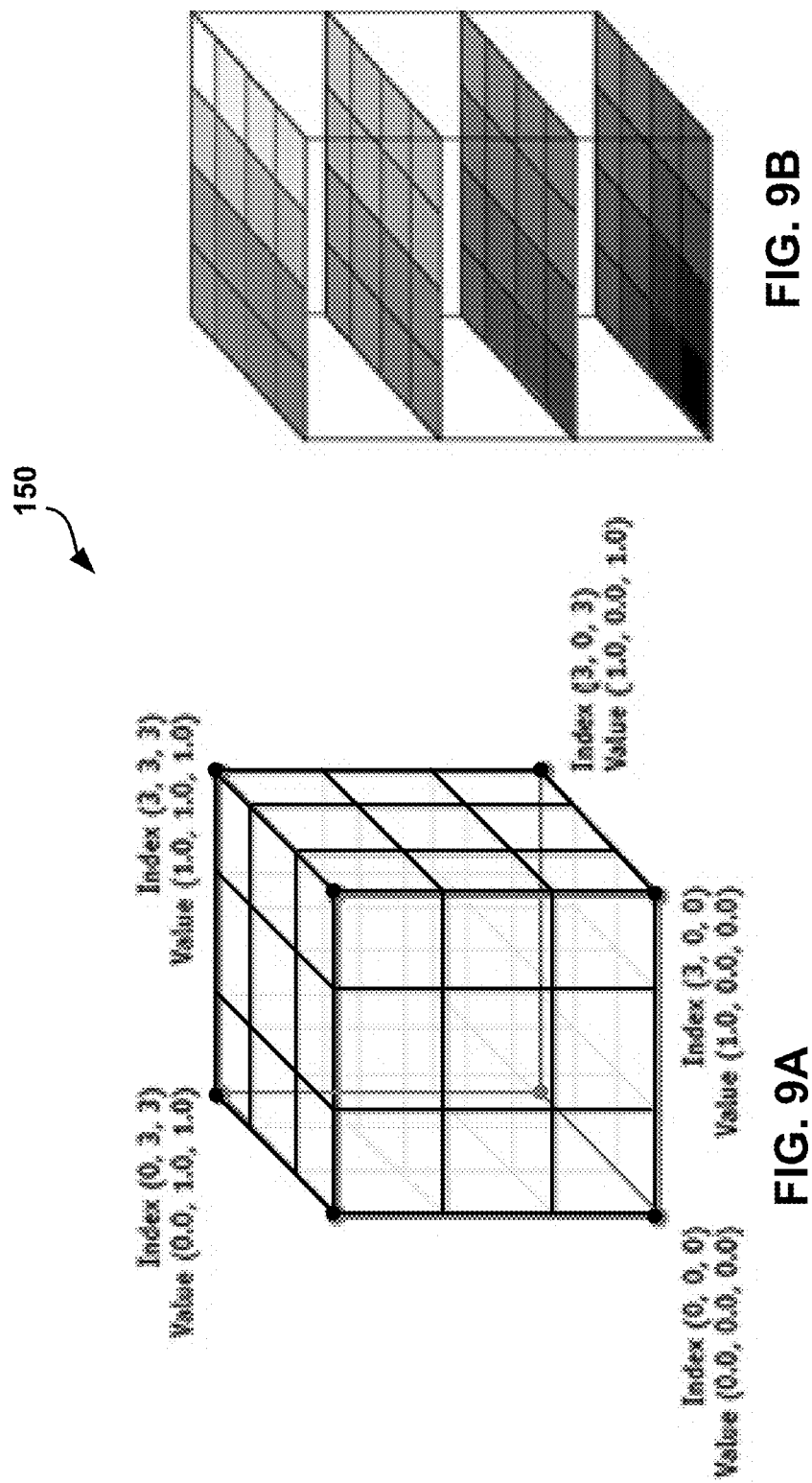
FIGS. 9A and 9B are conceptual illustrations showing an example 3D lookup table for color gamut scalability.

FIGS. 9A and 9B are conceptual illustrations showing an example 3D lookup table 150 for color gamut scalability. A 3D lookup table based color prediction model is proposed in P. Bordes, P. Andrivon, F. Hiron, "AHG14: Color Gamut Scalable Video Coding using 3D LUT: New Results," JCTVC-N0168, Vienna, Austria, Jul. 2013 (hereinafter referred to as "JCTVC-N0168"). The principle of the 3D lookup table for color gamut scalability is depicted in FIGS. 9A and 9B. The 3D lookup table 150 can be considered as a sub-sampling of a first 3D color space, e.g., HD color gamut BT.709, where each vertex is associated with a color triplet (y, u, v) corresponding to a second 3D color space (i.e., predicted) values, e.g., UHD color gamut BT.2020).

In general, the first color gamut may be partitioned into octants or cuboids in each color dimension (i.e., Y, U, and V), and the vertices of the octants are associated with the color triplet corresponding to the second color gamut and used to populate 3D lookup table 150. The number of vertices or segments in each color dimension indicates the size of 3D lookup table. FIG. 9A illustrates the vertices or intersecting lattice points of the octants in each color dimension. FIG. 9B illustrates the different color values associated with each of the vertices. As illustrated, in FIG. 9A each color dimension has four vertices and in FIG. 9B each color dimension includes four color values.

Figure 10:
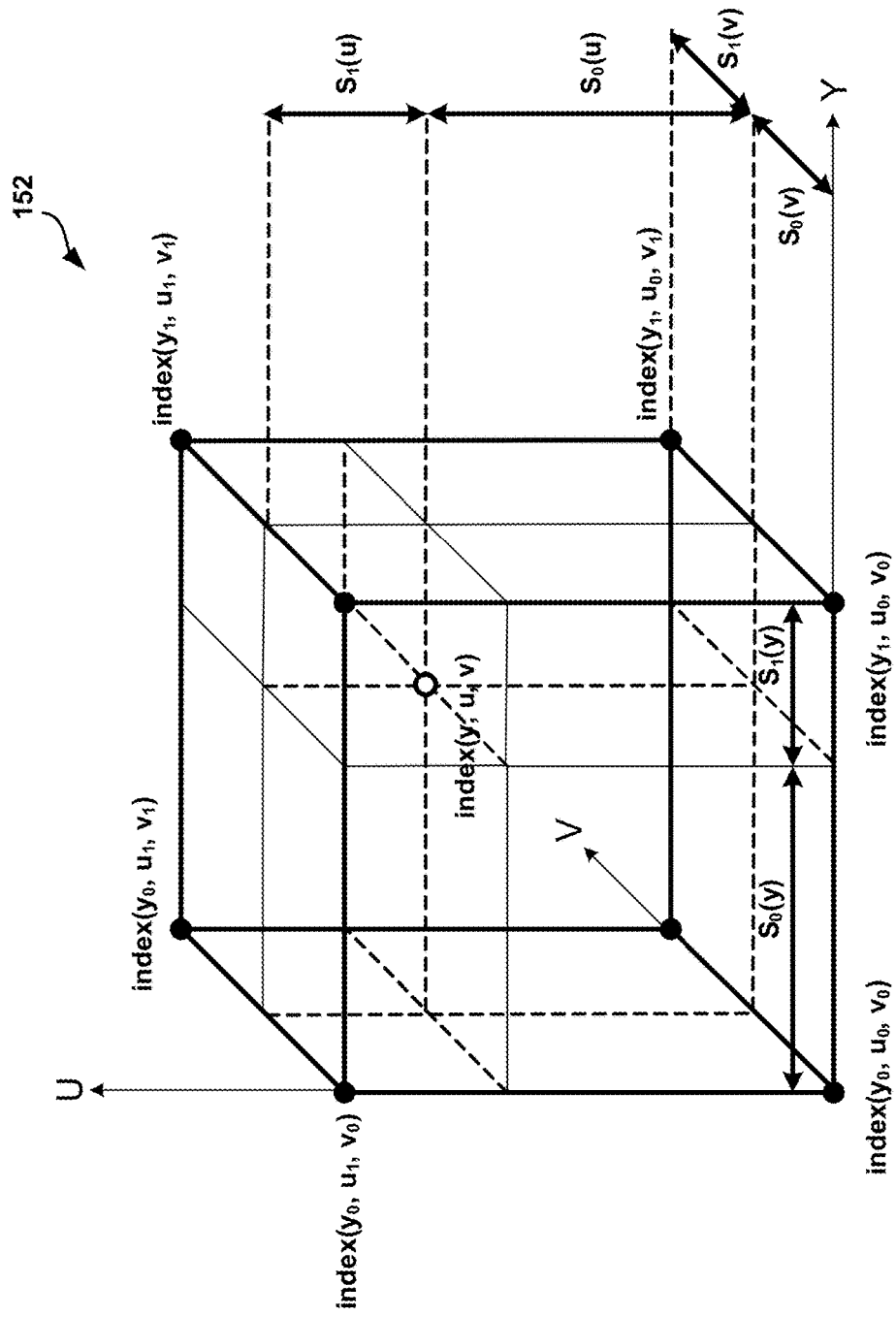
FIG. 10 is a conceptual illustration showing tri-linear interpolation with a 3D lookup table for color gamut scalability.

FIG. 10 is a conceptual illustration showing tri-linear interpolation with a 3D lookup table 152 for color gamut scalability. For a given base layer color sample in the first color gamut, the computation of its prediction in the second color gamut for an enhancement layer is made using tri-linear interpolation according to the following equation:

$$\overline{\text{value}}_y = K \times \sum_{i=0,1} \sum_{j=0,1} \sum_{k=0,1} s_i(y) \times s_j(u) \times s_k(v) \times LUT[y_i][u_j][v_k] \cdot y$$

$$\text{Where: } K = \frac{1}{(y_1 - y_0) \times (u_1 - u_0) \times (v_1 - v_0)}$$

$$S_0(y) = y_1 - y \text{ and } S_1(y) = y - y_0$$

$y_0$ is the index of the nearest sub-sampled vertex inferior to y, $y_1$ is the index of the nearest sub-sampled vertex superior to y.

More details of the 3D lookup table illustrated in FIGS. 9A and 9B and the tri-linear interpolation with the 3D lookup table illustrated in FIG. 10 may be found in JCTVC-N0168, referenced above.

Figure 11:
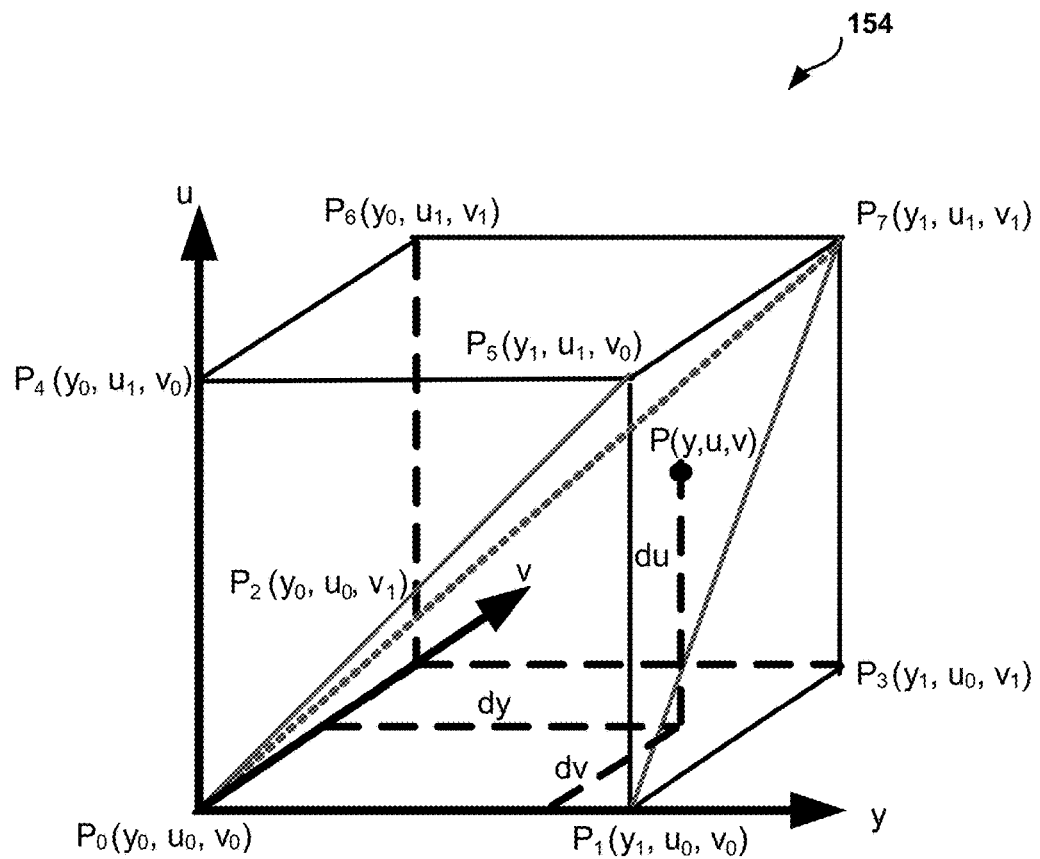
FIG. 11 is a conceptual illustration showing tetrahedral interpolation with a 3D lookup table for color gamut scalability.

FIG. 11 is a conceptual illustration showing tetrahedral interpolation with a 3D lookup table 154 for color gamut scalability. The tetrahedral interpolation may be used instead of the tri-linear interpolation described above to reduce the computational complexity of the 3D lookup table.

Figure 12:
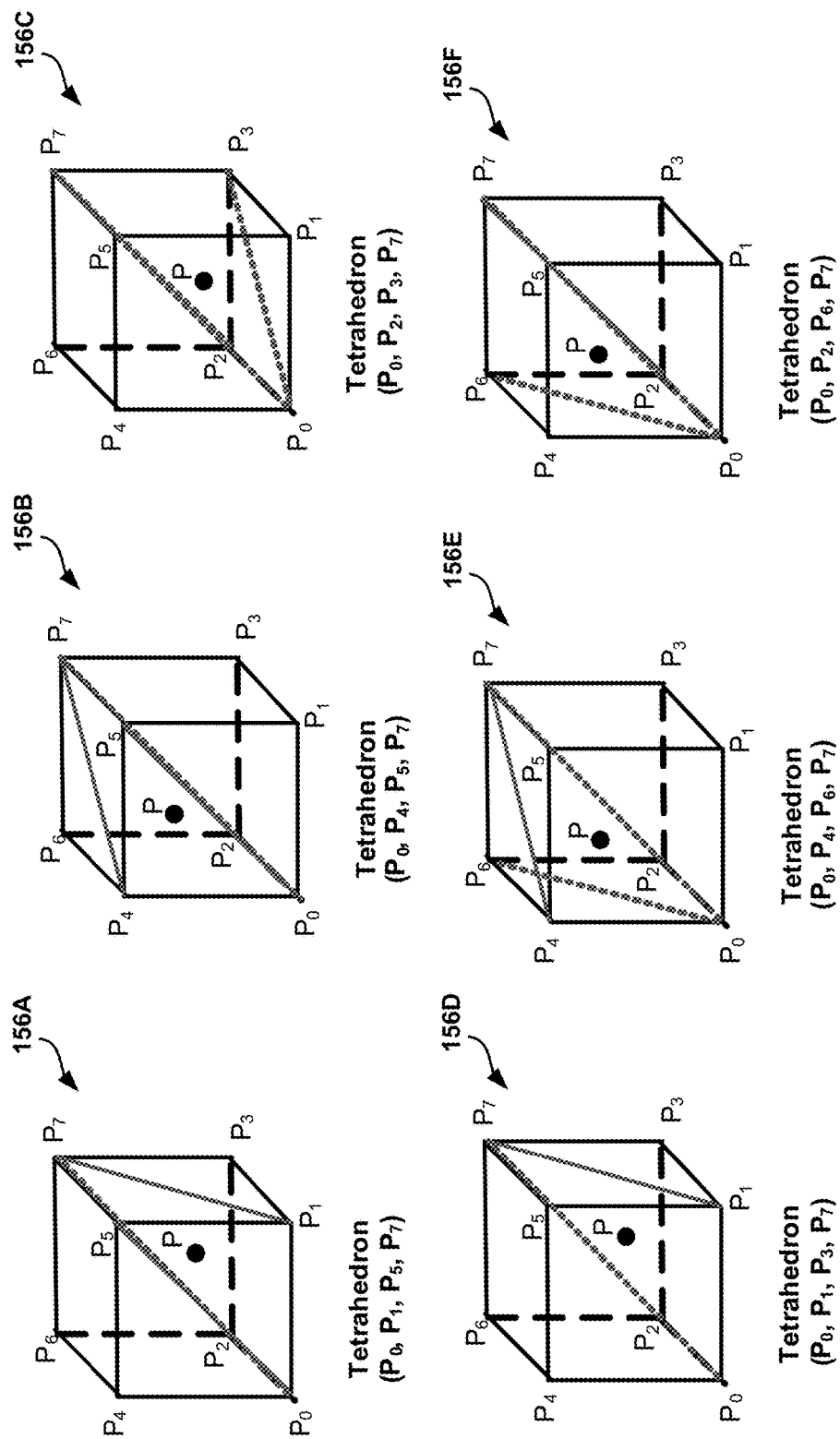
FIG. 12 is a conceptual illustration showing six examples of tetrahedrons used to encompass a point P of a 3D lookup table to be interpolated using tetrahedral interpolation.

FIG. 12 is a conceptual illustration showing six examples of tetrahedrons 156A-156F (collectively "tetrahedrons 156") used to encompass a point P of a 3D lookup table to be interpolated using tetrahedral interpolation. In the example of FIG. 12, there are six choices to determine the tetrahedron containing the point P to be interpolated in an octant of the 3D lookup table given that vertexes $P_0$ and $P_7$ have to be included in the tetrahedron. Using tetrahedral interpolation, the 3D lookup table may be designed for a fast decision instead of checking the relationship of each two components: y and u, y and v, u and v.

In some examples, a separate 3D lookup table may be generated for each of the color components, i.e., a luma (Y) component, a first chroma (U) component and a second chroma (V) component. Each of the 3D lookup tables includes a luma (Y) dimension, a first chroma (U) dimension and a second chroma (V) dimension, and is indexed using the three independent color components (Y, U, V).

In one example, a mapping function may be defined for each color component based on the 3D lookup table. An example mapping function for a luma (Y) pixel value is presented in the following equation:

$$Y_E = LUT_Y(Y_B, U_B, V_B) * Y_B + LUT_U(Y_B, U_B, V_B) * U_B + LUT_V(Y_B, U_B, V_B) * V_B + LUT_C(Y_B, U_B, V_B)$$

In the above equation, $Y_E$ represents the luma pixel value in the enhancement layer, ($Y_B$, $U_B$, $V_B$) represents a base layer pixel value, and $LUT_Y$, $LUT_U$, $LUT_V$ and $LUT_C$ represent the 3D lookup table for each color component Y, U, V, and a constant, respectively. Similar mapping functions may be defined for a first chroma (U) pixel value and a second chroma (V) pixel value in the enhancement layer.

In general, 3D lookup table based color gamut scalability results in good coding performance. The size of the 3D lookup table may be concern, however, since the 3D lookup table is typically stored in cache memory in a hardware implementation. Conventionally, the 3D lookup tables are always symmetric such that the 3D lookup tables have a same size for the luma component, the first chroma component and the second chroma component. In addition, conventionally, the 3D lookup tables are always balanced such that a size of each dimension of the 3D lookup tables is always the same. This results in large table sizes with high computational complexity and high signaling costs. For example, table sizes may be up to 9×9×9 or 17×17×17.

In some cases, the size of the 3D lookup table used for color gamut scalability is too large, which may lead to difficulty in practical implementations. In addition, the large table size and the use of tri-linear interpolation for the 3D lookup table results in high computational complexity.

In U.S. patent application Ser. No. 14/512,177, filed Oct. 10, 2014, the following methods are proposed so that both signaling cost and computational complexity for the 3D lookup table based color gamut scalability may be reduced.

The first method includes generating an asymmetric 3D lookup table such that the luma (Y) and chroma (U and V) components have different sizes. In some cases, the 3D lookup table may have a larger size, i.e., more segments or octants, for the luma component than for each of the first and second chroma components. In this case, the chroma components may use a coarser lookup table and the luma component may use a more refined lookup table. For example, table sizes may be up to 8×2×2. In other cases, the 3D lookup table may have a larger size for one or both of the chroma components than for the luma component.

The second method includes generating an unbalanced 3D lookup table, i.e. table[M][N][K], such that the size of each dimension is different depending on which color component is being used as a table index for the 3D lookup table. The 3D lookup table may have a larger size for the dimension associated with the color component used as the table index. In this case, the color mapping may be more accurate for the color component used as the table index, while being less accurate for the other color components.

The third method includes generating only a luma component 3D lookup table, and only using the 3D lookup table to perform luma component prediction. The one-dimensional (1D) linear mapping or piecewise linear mapping techniques may be used for the chroma components.

The techniques of this disclosure are directed toward signaling of the information used to generate 3D lookup tables for color gamut scalability. According to the techniques, video encoder 20 may encode partition information and/or color values of a 3D lookup table generated for color gamut scalability. Video decoder 30 may decode the partition information and/or color values to generate the 3D lookup table in order to perform color gamut scalability. The disclosed techniques provide efficient partitioning of the color components of the 3D lookup table and efficient signaling of the partition information and/or color values for the 3D lookup table. In this way, the disclosed techniques may reduce both signaling cost and computational complexity for generating the 3D lookup table. The techniques described in this disclosure may be particularly useful in signaling the information used to generate asymmetric and/or unbalanced 3D lookup tables.

In one example, the techniques described in this disclosure may provide more efficient partitioning of the color components of the 3D lookup table by enabling asymmetric partitions such that the 3D lookup table has coarser partitioning for first and second chroma (e.g., Cb and Cr or U and V) components and finer partitioning for a luma (e.g., Y) component. The techniques may also provide more efficient signaling of the partition information for the 3D lookup table by signaling a number of additional partitions for the luma component on top of a base number of partitions for the 3D lookup table. In another example, the techniques may provide more efficient partitioning of the color components of the 3D lookup table by enabling joint partitioning of the first and second chroma (e.g., Cb and Cr or U and V) components.

The techniques may also provide more efficient signaling of the information used to generate the 3D lookup table for color gamut scalability (CGS) by enabling one or more of the following. In a first example, a flag or an index may be signaled to indicate where the CGS color prediction information is signaled, such as in a video parameter set (VPS), a sequence parameter set (SPS), a picture parameter set (PPS), a slice header or any other high level syntax header. In a second example, a number of partitions may be signaled to indicate a size, i.e., a number of segments or octants, of an asymmetric and/or unbalanced 3D lookup table. In a third example, when the chroma components are jointly partitioned, a range of a chroma center partition may be signaled.

In a fourth example, lower level (e.g., slice level) parameters of the CGS color prediction information may be predictively coded from higher level (e.g., PPS level) parameters of the CGS color prediction information. In a fifth example, a syntax table of the CGS color prediction information may be signaled in the bitstream, such as in the VPS, SPS, PPS, or slice header. When several CGS color prediction syntax tables are signaled at different locations in the bitstream, the syntax table at the lowest level that covers the picture to be coded may be used for the picture. In a sixth example, the syntax table of CGS color prediction information may be conditionally signaled according to whether texture prediction is enabled for the picture to be coded. When a higher layer of video data, i.e., an enhancement layer, has multiple texture reference layers, CGS color prediction syntax tables may be signaled for all or some of the reference layers whose color gamut is different than the enhancement layer. In a seventh example, in order to maintain low complexity, the CGS color prediction syntax table may be further constrained to be signaled, at most, for only one reference layer per picture.

In an eighth example, a partitioning boundary may be signaled for at least one of the first and second chroma components in order to obtain uneven partitioning along the one of the chroma directions in the 3D lookup table. The partitioning boundary information may be conditionally signaled when the at least one of the chroma components is partitioned into two or more segments or octants along the chroma direction.

Once each of the color components of the 3D lookup table is partitioned into one or more octants, the techniques described in this disclosure may provide more efficient signaling of the color values of the 3D lookup table. The techniques include signaling, for each octant for each of the color components of the 3D lookup table, either values of vertexes of each of the octants or color mapping coefficients of a linear color mapping function for each of the octants. In this disclosure, the terms "partition," "octant," "segment," and "cuboid," may be used interchangeably to describe the partitioned regions of the color components of the 3D lookup table.

In a first example, for each octant for each of the color components, vertexes of the octant may be signaled. In this example, a residual value between a predicted value of a given vertex and an actual value of the given vertex may be signaled. In some cases, the residual value may be further quantized. The quantization step information, e.g., a quantization value, may signaled or may be a predefined value. The residual value may be coded with kth-order exp-golomb coding. The order k may be signaled in the bitstream or adaptively derived based on other information, such as the magnitude of the residual values, in the bitstream. For each octant or partition, not all vertexes need to be signaled. For example, at least four vertexes may be signaled if neighboring octants or cuboids do not share vertex values. The at least four vertexes may be used to interpolate all the values in the octant or cuboid.

In a second example, for each octant for each of the color components, color mapping coefficients (i.e., a, b, c and d) for a linear color mapping function of color values in the 3D lookup table may be signaled instead of the vertexes of the octant. The linear color mapping function with color mapping parameters may be used directly to perform color gamut prediction. The linear color mapping function is used to convert color data in a first color gamut for a lower layer of video data to a second color gamut for a higher layer of video data, and the color mapping coefficients are weighting factors between color components of the lower and higher layers of the video data. In this disclosure, the terms "color mapping coefficients" and "linear color prediction coefficients" may be used interchangeably. In addition, the terms "linear color mapping function," "linear color prediction function," and "3D linear equation," may also be used interchangeably.

In this example, the color mapping coefficients (i.e., a, b, c and d) may be converted or quantized from floating point values to integer values using a predefined number of bits. In some cases, the conversion or quantization information may be signaled in the bitstream. In other cases, the conversion or quantization information (i.e., the number of bits used to represent the value of 1) may be dependent on at least one of the input bit-depth or output bit-depth of the 3D lookup table.

For each of the color components, one of the color mapping coefficients of the linear color mapping function may be a key coefficient that defines a weighting factor of the same color component being predicted. For example, when predicting the first chroma component of the higher layer (i.e., $U_e$) using the linear color mapping function $U_e = a \cdot Y_b + b \cdot U_b + c \cdot V_b + d$, b is the key coefficient because it is the weighting factor between the first chroma component of the lower layer (i.e., $U_b$) and the first chroma component of the higher layer (i.e., $U_e$) being predicted. The signaling of the key coefficient may be different from the other coefficients. In some examples, the prediction of the key coefficients may be dependent on a predefined non-zero value, while the prediction of the other coefficients may be dependent on a predicted value equal to zero. In other examples, the prediction of the key coefficients may be dependent on at least one of the input bit-depth or the output bit-depth of the 3D lookup table.

The numerous examples described above of techniques for efficient partitioning and signaling a 3D lookup table for color gamut scalability may be used alone or in any combination, and should not be limited to the example combinations described in this disclosure. Additional details of the disclosed techniques for efficient partitioning of the color components of the 3D lookup table and efficient signaling of the partition information and/or color values for the 3D lookup table are provided below.

As described above, in one example, video encoder 20 and/or video decoder 30 may generate a 3D lookup table for color gamut scalability by performing joint partitioning of the first and second chroma components. In a conventional 3D lookup table, the luma, first chroma, and second chroma (i.e., Y, U, and V) components are independently partitioned. When each component is split into N segments or octants, the total number of octants may be N×N×N, which results in a large 3D lookup table. For example, table sizes may be up to 9×9×9 or 17×17×17. To reduce the number of octants, the techniques of this disclosure may provide for independent partitioning of the luma (i.e., Y) component while jointly partitioning the first and second chroma (i.e., U and V) components.

For example, the luma component may be evenly split into M partitions or octants. The 2D U×V space of the first and second chroma components may then be split into two partitions as follows:

if ($2^{CBit-1} - R < u < 2^{CBit-1} + R$ and $2^{CBit-1} - R < v < 2^{CBit-1} + R$)

$(u, v) \rightarrow$ Partition 0 else $(u, v) \rightarrow$ Partition 1 where (u, v) indicates the pixel values of the U and V components, CBit represents the bit depth of the chroma components, $2^{CBit-1}$ corresponds to a center value of the chroma pixels, and R denotes the distance to the center value $2^{CBit-1}$. In some cases, R may be a predefined fixed value; otherwise R may be a value signaled in the bitstream, such as in the VPS, SPS, PPS, or slice header.

Figure 13:
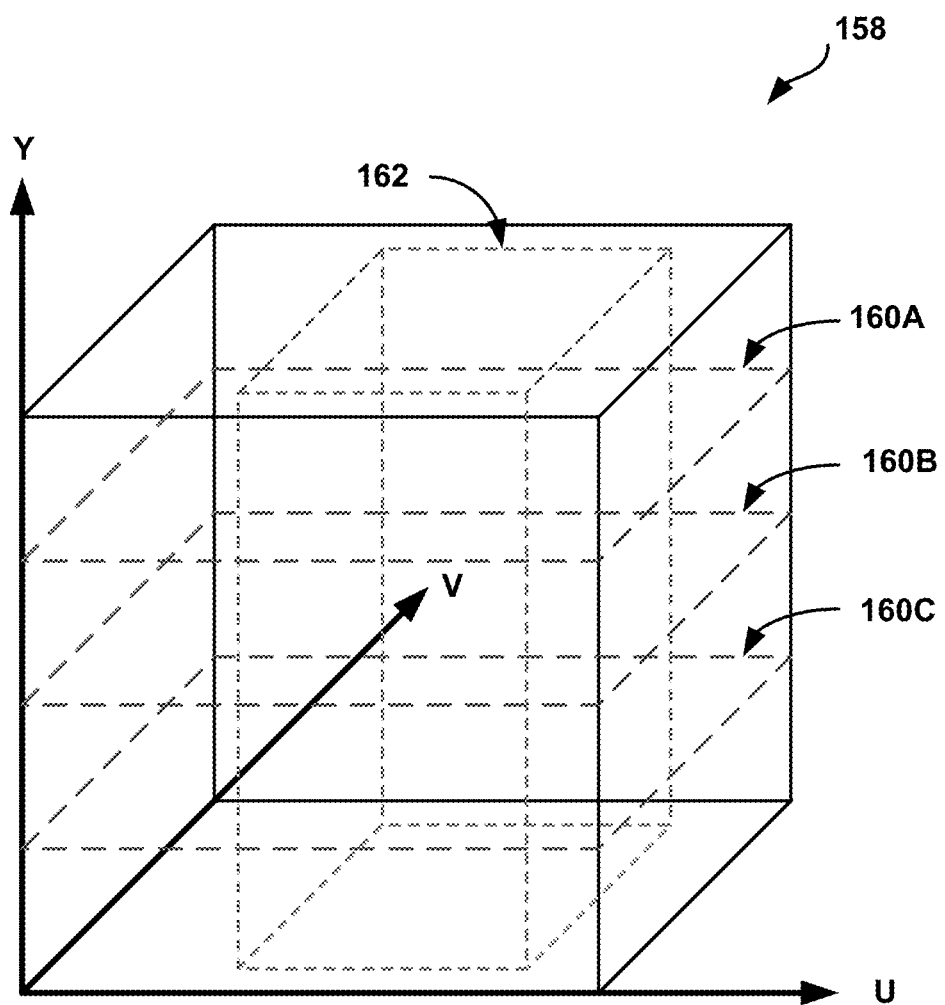
FIG. 13 is a conceptual illustration showing an example 3D lookup table with an independently partitioned luma component and jointly partitioned chroma components.

FIG. 13 is a conceptual illustration showing an example 3D lookup table 158 with an independently partitioned luma component and jointly partitioned chroma components. In the illustrated example of FIG. 13, the luma (i.e., Y) component is evenly partitioned into four parts according to partition lines 160A, 160B and 160C. The chroma (i.e., U-V) components are partitioned into two regions according to a partition cuboid 162. In this case, for a chroma pair pixel value (u, v), it is either inside partition cuboid 162 or outside partition cuboid 162. In the example of FIG. 13, 3D lookup table 158 is partitioned into 4×2=8 partitions.

In another example, the chroma components (i.e., U-V) are jointly partitioned while the luma component (i.e., Y) is split into M partitions, but the M partitions may not necessarily be the same size. In other words, the luma component may be unevenly partitioned such that at least one of the partitions has a different size than the other partitions. For example, a partition located close to a center value of the luma component may be more refined, i.e., smaller, than those partitions located further away from the center value.

In the example of joint chroma component (i.e., U-V) partitioning, the syntax tables and related semantics for signaling color mapping coefficients of a linear color mapping function for color gamut scalability (CGS) may be as follows in Tables 1-3 below. Any edits, additions, or updates to the SHVC WD3, cited above, are indicated by italicized text.

TABLE 1

Picture parameter set (PPS) RBSP syntax

| pic_parameter_set_rbsp( ) { | Descriptor |
|---|---|
| ... | |
| pps_extension_flag | u(1) |
| if( nuh_layer_id > 0 ) | |
| *cgs_enable_flag* | *u(1)* |
| *if( nuh_layer_id > 0 && cgs_enable_flag) {* | |
| *cgs_info_in_pps_flag* | *u(1)* |
| *if(cgs_info_in_pps_flag)* | |
| *cgs_info_table( )* | |
| *}* | |
| ... | |
| } | |

The cgs_enable_flag equal to 1 specifies that color gamut scalability is enabled. The cgs_enable_flag equal to 0 specifies that color gamut scalability is disabled. When not present, cgs_enable_flag is inferred to be 0.

The cgs_info_in_pps_flag equal to 1 specifies that cgs_info_table is present in the PPS. cgs_info_in_pps_flag equal to 0 specifies that cgs_info_table is not present in PPS but is present in slice header. When not present, cgs_info_in_pps_flag is inferred to be 0.

TABLE 2

Color gamut scalability (CGS) color prediction information syntax

| cgs_info_table( ) { | Descriptor |
|---|---|
| *cgs_uv_part_range_from_center* | *ue(v)* |
| *cgs_y_part_num_log2* | *ue(v)* |
| *for( i = 0; i < CGS_PART_NUM; i++ ) {* | |
| *for( j = 0; j < 3 ; j++ ) {* | |
| *for( l = 0; l < 4 ; l++ ) {* | |
| *if ( j == l )* | |
| *cgs_color_pred_coeff_minus128[i][j][l]* | *se(v)* |
| *else* | |
| *cgs_color_pred_coeff [i][j][l]* | *se(v)* |
| *}* | |
| *}* | |
| *}* | |
| *}* | |

The cgs_uv_part_range_from_center syntax element specifies the range of chroma partition from the center value of chroma component. When not present, cgs_uv_part_range_from_center is inferred to be 0.

The cgs_y_part_num_log2 syntax element specifies the number of luma partitions in CGS color prediction. When not present, cgs_y_part_num_log2 is inferred to be 0. The CGS_PART_NUM parameter is derived as follows: CGS_PART_NUM=1<<(cgs_y_part_num_log2+1).

The cgs_color_pred_coeff_minus128 syntax element and the cgs_color_pred_coeff syntax element each specify color mapping coefficients of a linear color mapping function for CGS. When not present, they are inferred to be 0. It should be noted that, in some examples, the cgs_color_pred_coeff_minus128 and cgs_color_pred_coeff syntax elements may be signaled using different entropy coding methods. In the example in Table 2 above, the entropy coding method of se(v) is used. Alternatively, kth-order exp-golomb coding or fixed length coding may be used. It should also be noted that the cgs_color_pred_coeff_minus128 syntax element may indicate the predicted value for a key coefficient as a predefined fixed number equal to 128, which is the integer value used to represent a floating point value of 1.0 in this example.

TABLE 3

Slice header syntax

| slice_segment_header( ) { | Descriptor |
|---|---|
| ... | |
| *if(nuh_layer_id > 0 && cgs_enable_flag &&* | |
| *!cgs_info_in_pps && NumActiveRefLayerPics > 0)* | |
| *cgs_info_table( )* | |
| if( sample_adaptive_offset_enabled_flag ) { | |
| ... | |
| } | |

When color gamut scalability is enabled (e.g., cgs_enable_flag=1) and the cgs_info_table is not present in the PPS (e.g., cgs_info_in_pps_flag=0), the cgs_info_table is not present in PPS but is present in the slice header.

As described above, in another example, video encoder 20 and/or video decoder 30 may generate a 3D lookup table for color gamut scalability with coarser partitioning for the first and second chroma (e.g., Cb and Cr or U and V) components and finer partitioning for the luma (e.g., Y) component. Video encoder 20 and/or video decoder 30 may generate this 3D lookup table by partitioning each of the color components into a number of octants according to a base partition value, e.g., a maximal split depth for the 3D lookup table, and then further partitioning each of the octants of the luma component based on a luma partition value. In one example, the luma partition value may be signaled in a bitstream by video encoder 20 to video decoder 30. In some cases, the base partition value may also be signaled in the bitstream by video encoder 20 to video decoder 30. In other cases, the luma partition value may be derived at both video encoder 20 and video decoder 30, and/or the base partition value may be a predefined value known at both the video encoder and the video decoder.

In one example, video encoder 20 and/or video decoder 30 first constructs the 3D lookup table in such a way that the each of the color components (i.e., the Y-U-V space) is iteratively and symmetrically split or partitioned until a predefined or signaled split depth is reached. The split depth defines a maximum number of times all of the color components of the 3D lookup table may be partitioned. In this way, the base partition value may be defined as a split depth. Then video encoder 20 and/or video decoder 30 further evenly, or not evenly, splits each smallest cube or octant along the luma (i.e., Y) direction so that the luma (i.e., Y) component has finer partitioning while the chroma (i.e., U and V) components have coarser partitioning.

For example, the proposed 3D lookup table with finer partitioning for the luma component and coarser partitioning for the chroma components may be signaled as follows in Table 4 below. Any edits, additions, or updates to the SHVC WD3, cited above, are indicated by italicized text.

TABLE 4

3D lookup table color data syntax

| 3D_LUT_color_data ( ) { | Descriptor |
|---|---|
| cur_octant_depth | u(3) |
| *cur_y_part_num_log2* | *u(2)* |
| input_bit_depth_minus8 | u(4) |
| output_bit_depth_minus8 | u(4) |
| *res_quant_bit* | *u(3)* |
| coding_octant( 0, 0, 0, 0, 1 << InputBitDepth) | |
| } | |

The cur_octant_depth syntax element indicates the maximal split depth for the Y-U-V space for the current table. In other words, the cur_octant_depth sytnax element indicates the base partition value for the 3D lookup table.

The cur_y_part_num_log2 syntax element specifies the number of Y partitions for the smallest cube. Alternatively, the cur_y_part_num_log2 syntax element specifies the number of Y partitions for the cube whose split_octant_flag is equal to 0. In other words, the cur_y_part_num_log2 syntax element indicates the luma partition value for the luma component of the 3D lookup table. In one example, the base partition value indicated by cur_octant_depth is equal to 1 such that each of the color components is partitioned into a single octant, and the luma partition value indicated by cur_y_part_num_log2 is equal to 4 such that the single octant of the luma component is partitioned into four octants, which results in a 3D lookup table of size 4×1×1. As another example, the base partition value indicated by cur_octant_depth is equal to 2 such that each of the color components is partitioned into two octants, and the luma partition value indicated by curypart num log2 is equal to 4 such that each of the two octants of the luma component is partitioned into four octants, which results in a 3D lookup table of size 8×2×2.

The input_bit_depth_minus8 syntax element specifies the bit-depth of the 3D lookup table entries. The InputBitDepth parameter may be computed as follows: InputBitDepth=8+input_bit_depth_minus8.

The ouput_bit_depth_minus8 syntax element specifies the bit-depth of the 3D lookup table output. The OutputBitDepth parameter may be computed as follows: OutputBitDepth=8+output_bit_depth_minus8.

The res_quant_bit syntax element specifies the number of bits used in quantizing either vertex residual values or color mapping coefficient residual values for each octant for each color component of the 3D lookup table. The quantization of the residual values is achieved by right shifting the vertex residual values or the color mapping coefficient residual values by res_quant_bit.

The coding_octant syntax table is described in more detail with respect to Table 5 below. In the example of the coding_octant syntax table shown in Table 5 below only the smallest octant or cuboid is further split along the luma (i.e., Y direction) such that the luma (i.e., Y) component has finer partitioning than the chroma (i.e., U and V) components. In some examples, any octant or cuboid may be split along the luma direction. In this example, whether an octant is further split along the luma direction may be signaled in the bitstream.

As described above, in a further example, video encoder 20 and/or video decoder 30 may generate the 3D lookup table based on a number of octants for each of the color components and color values for each of the octants. In some cases, the number of octants for at least one of the color components of the 3D lookup table may be signaled by video encoder 20 to video decoder 30. In order for video decoder 30 to determine the color values for each octant for each of the color components of the 3D lookup table, video encoder 20 may signal either vertexes of each of the octants or color mapping coefficients for a linear color mapping function of color values for each of the octants.

In one example described above, for each of the octants or partitions, video encoder 20 may signal the color mapping coefficients of the linear color mapping function of the color values in the 3D lookup table. The linear color mapping function is used to convert color data in a first color gamut for a lower layer of video data to a second color gamut for a higher layer of video data, and the color mapping coefficients are weighting factors between color components of the lower and higher layers of the video data. For each of the color components, one of the color mapping coefficients may be a key coefficient that defines a weighting factor between the same color component of the lower and higher layers of the video data.

The common linear color mapping function may be represented as follows.

$$\begin{bmatrix} Y_e \\ U_e \\ V_e \end{bmatrix} = \begin{bmatrix} a_{00} \cdot Y_b + b_{01} \cdot U_b + c_{02} \cdot V_b + d_{03} \\ a_{10} \cdot Y_b + b_{11} \cdot U_b + c_{12} \cdot V_b + d_{013} \\ a_{20} \cdot Y_b + b_{21} \cdot U_b + c_{22} \cdot V_b + d_{23} \end{bmatrix}$$

In this example function, the subscript e and b denote the higher layer (i.e., enhancement layer) and lower layer (e.g., base layer), respectively, for each of the luma, first chroma, and second chroma color components (i.e., Y, U, and V). The parameters a, b, c, and, d represent the color mapping coefficients. In some examples, color mapping coefficients $a_{00}$, $b_{11}$ and $c_{22}$ represent the key coefficients for each of the color components, i.e., the weighting factors between the same color component of the base and enhancement layers). Although these coefficients are referred to as key coefficients in this disclosure, this name should not be considered limiting as similarly defined coefficients may be referred to by other names. In some examples, the color mapping coefficients (i.e., a, b, c, and d) of the linear color mapping function for a given octant may be converted to the vertexes of the given octant first, and then the values of the vertexes may be coded in the bitstream to represent the color values in the 3D lookup table.

In some examples, the color mapping coefficients (i.e., a, b, c, and d) of the linear color mapping function are derived as floating point values. In this example, video encoder 20 may convert or quantize the floating point values of the color mapping coefficients into integer values, and then encode the integer values into the bitstream for each octant. For example, the integer values of the color mapping coefficients may be encoded in the cgs_info_table depicted in Table 2 above, or may be encoded in the coding_octant table depicted in Table 5 below. Video decoder 30 may then perform integer operations using the integer values of the color mapping coefficients.

In order to represent the floating point values of the color mapping coefficients with reasonable accuracy, an integer value is selected to represent a floating point value of 1.0, e.g., using 256 (8 bits) as the integer value to represent the floating point value of 1.0. Video encoder 20 may perform the conversion or quantization according to the following equation: $A=\lfloor a \cdot 2^N \rfloor$, where a denotes the floating point value of the color mapping coefficient to be converted or quantized, A is the converted or quantized integer value, $\lfloor x \rfloor$ indicates a floor function that rounds a parameter x to a maximal integer value that is smaller than x, and N indicates a number of bits needed to convert or quantize the floating point value of 1.0. In this way, the integer values that represent the floating point values have a bit-depth (e.g., 8 bits) based on the parameter N.

In one example, the conversion or quantization may be based on the parameter N, in the exponent of the above equation $A=\lfloor a \cdot 2^N \rfloor$, set to a predefined fixed value, such as 8 or 10. In another example, the conversion or quantization may be based on a value of N determined based on at least one of an input bit-depth (i.e., $B_i$) or an output bit-depth (i.e., $B_o$) of the 3D lookup table. For example, the conversion or quantization may be based on the parameter N determined according to one of the following equations.

$$N=B_i,$$

$$N=B_o,$$

$$N=10+B_i-B_o, \text{ or}$$

$$N=8+B_i-B_o.$$

In some examples, video encoder 20 and/or video decoder 30 may predict the color mapping coefficients, and code residual values of the color mapping coefficients as the difference between original values of the color mapping coefficients and the predicted values of the color mapping coefficients. For example, for a given octant, the prediction or part of the prediction for at least one of the color mapping coefficients, e.g., one of the key coefficients, may be based on a predicted value equal to a predefined fixed value. In one example, the predicted value may be set equal to $2^N$, where N is the quantization bit value described above. As another example, for the given octant, the prediction or part of the prediction for at least one of the color mapping coefficients, e.g., one of the key coefficients, may be dependent on at least one of the input bit-depth (i.e., $B_i$) or the output bit-depth (i.e., $B_o$) of the 3D lookup table. For example, the prediction or part of the prediction may be based on a predicted value equal to $2^{N+B_o-B_i}$.

As one example, video encoder 20 and/or video decoder 30 may perform prediction of the color mapping coefficients as follows. For a first octant for each of the color components, the color mapping coefficients of the linear color mapping function may be predicted based on predefined fixed values. The key coefficient for each of the color components may be predicted differently than the other coefficients. For example, a key coefficient may be predicted based on a predicted value equal to a predefined non-zero value, and any remaining color mapping coefficients may be predicted based on a predicted value equal to zero. In this example, the color mapping coefficients of any remaining octants for each of the color components may be predicted based on predicted values from at least one previous octant, such as the first octant.

As another example of the prediction of the color mapping coefficients, for the first octant for each of the color components, the prediction value for the key coefficients for all the color components may be set equal to $2^{N+B_o-B_i}$, and the prediction values for the other coefficients may be set equal to 0. In this example, the coefficients of the remaining octants for each of the color components may be predicted from the previous octant. In a further example, the prediction of the color mapping coefficients may be performed between different partitions or octants for each of the color components. Alternatively, a set of color mapping coefficients may be signaled as base coefficients, such as in the SPS or PPS. Then, the differences between the actual values of the color mapping coefficient and the values of the base coefficients may be signaled at the picture or slice level.

In some cases, the residual values of the color mapping coefficients may be quantized based on a determined quantization value. Video encoder 20 may signal the determined quantization value for video decoder 20 to perform inverse quantization to properly decode the color mapping coefficients. In one example, the determined quantization value may be indicated by the res_quant_bit syntax element described in more detail with respect to Table 4 above.

In this case, for each of the octants for each of the color components, video encoder 20 may calculate residual values of the color mapping coefficients based on original values of the color mapping coefficients and the predicted values of the color mapping coefficients, quantize the residual values of the color mapping coefficients based on the determined quantization value, and then encode the residual values of the color mapping coefficients in the bitstream. Video encoder 20 may also encode the res_quant_bit syntax element to indicate the determined quantization value. Video decoder 30 then decodes the res_quant_bit syntax element and the residual values of the color mapping coefficients, inverse quantizes the residual values of the color mapping coefficients based on the determined quantization value, and reconstructs the color mapping coefficients based on the decoded residual values and predicted values of the color mapping coefficients.

In addition, the values of the color mapping coefficients may be restricted to be within a given range based on a predefined fixed value or a value dependent on at least one of an input bit-depth or an output bit-depth of the 3D lookup table. The value of the color mapping coefficients (i.e., a, b, c, and d) may be limited to a certain range to reduce the computational complexity of generating the 3D lookup table. As one example, the value can be restricted to be in the range of $-2^M$ to $2^M-1$, inclusive, where M is set equal to a predefined fixed value, such as 10 or 12. Alternatively, the value of M may be dependent on one or more of the quantization bit value N, the input bit-depth (i.e., $B_i$) or the output bit-depth (i.e., $B_o$) of the 3D lookup table.

In another example described above, for each of the octants or partitions, video encoder 20 may signal values of vertexes of the octant to indicate the color values in the 3D lookup table. The coding_octant syntax table, which may be used to signal the color values of the 3D lookup table, is primarily described in this disclosure with respect to signaling values of octant vertexes. However, this description should not be construed as limiting, as a substantially similar coding_octant syntax table may be used to signal values of color mapping coefficients for a linear color mapping function for each octant.

The coding_octant syntax table, included in the 3D lookup table color data syntax shown in Table 4 above, is described with respect to Table 5 below. Any edits, additions, or updates to the SHVC WD3, cited above, are indicated by italicized text.

TABLE 5

Coding octant syntax

| coding_octant (depth, y,u,v,length) { | Descriptor |
|---|---|
|   if ( depth < cur octant depth ) | |
|     split_octant_flag | u(1) |
|   if ( split octant flag ) { | |
|     for( l = 0 ; l < 2 ; l++ ) | |
|       for( m = 0 ; m < 2 ; m++ ) | |
|         for( n = 0 ; n < 2 ; n++ ) | |
|           coding_octant ( depth+1, y+l*length/2, u+m*length/2,v+n*length/2, length/2) | |
|   } | |
|   else { | |
|     for( i = 0 ; i < YPartNum ; i++ ) | |
|       for( vertex = 0; vertex < 4 ; vertex++ ) { | |
|         encoded_vertex_flag | u(1) |
|         if( encoded vertex flag ) { | |
|           resY[yIdx][uIdx][vIdx][vertex] | se(v) |
|           resU[yIdx][uIdx][vIdx][vertex] | se(v) |
|           resV[yIdx][uIdx][vIdx][vertex] | se(v) |
|         } | |
|       } | |
|     } | |
|   } | |
| } | |

In the example technique of signaling color mapping coefficients for a linear color mapping function for each octant of the 3D lookup table, the coding_octant syntax table may indicate residual values that are the differences between the color mapping coefficients (i.e., a, b, c, and d) for the linear color mapping function of the octant and the predicted color mapping coefficient values for the octant, instead of signaling the vertex residual values resY[yIdx][uIdx][vIdx][vertex], resU[yIdx][uIdx][vIdx][vertex], and resV[yIdx][uIdx][vIdx][vertex].

Returning to the example technique of signaling values of octant vertexes, each entry of the 3D lookup table may be derived as follows:

$$lutX[yIdx][uIdx][vIdx][vertex]=(resX[yIdx][uIdx][vIdx][vertex]<<res\_quant\_bit)+predX[yIdx][uIdx][vIdx][vertex],$$

where X indicates each of color components Y, U, and V, and predX[yIdx][uIdx][vIdx][vertex] is derived according to Table 6 below.

TABLE 6

Predicted values for vertexes of octants in 3D lookup table

| [yIdx][uIdx][vIdx][vertex] | vertex=0 | vertex=1 | vertex=2 | vertex=3 |
|---|---|---|---|---|
| predY[yIdx][uIdx][vIdx][vertex] | yIdx<<yoShift | yIdx<<yoShift | yIdx<<yoShift | (yIdx+1)<<yoShift |
| predU[yIdx][uIdx][vIdx][vertex] | uIdx<<uoShift | (uIdx+1)<<uoShift | (uIdx+1)<<uoShift | (uIdx+1)<<uoShift |
| predV[yIdx][uIdx][vIdx][vertex] | vIdx<<voShift | vIdx<<voShift | (vIdx+1)<<voShift | (vIdx+1)<<voShift |

The split_octant_flag equal to 1 specifies that an octant is split into eight octants with half size in all directions for the purpose of vertex residual octant coding. When not present, it is inferred to be equal to 0.

The variable YPartNum is derived as YPartNum=1<<cur_y_part_num_log2.

The encoded_vertex_flag equal to 1 specifies that the residuals of the vertex with index [yIdx2+i][uIdx][vIdx][vertex] are present. The encoded_vertex_flag equal to 0 specifies that the residuals for the vertex are not present. When not present, the flag is inferred to be equal to zero.

The variable yIdx is derived as follows.

$$yIdx=(y+l*(length>>cur\_y\_part\_num\_log\ 2))>>(InputBitDepth-cur\_octant\_depth-cur\_y\_part\_num\_log\ 2)$$

The variable uIdx is derived as follows.

$$uIdx=u>>(InputBitDepth-cur\_octant\_depth)$$

The variable vIdx is derived as follows.

$$vIdx=v>>(InputBitDepth-cur\_octant\_depth)$$

resY[yIdx][uIdx][vIdx][vertex], resU[yIdx][uIdx][vIdx][vertex], and resV[yIdx][uIdx][vIdx][vertex] are the differences (i.e., residual values) between the Y, U, and V components of the vertex with index [yIdx][uIdx][vIdx][vertex] and the predicted Y, U, and V component values for this vertex. When not present, these differences resY[yIdx][uIdx][vIdx][vertex], resU[yIdx][uIdx][vIdx][vertex], and resV[yIdx][uIdx][vIdx][vertex] are inferred to be equal to 0.

In some cases, an additional offset may be applied during the shift operation of the prediction procedure described with respect to Table 6 above.

In the example technique of signaling color mapping coefficients for a linear color mapping function for each octant of the 3D lookup table, similar equations may be used to derive or reconstruct the color mapping coefficients (i.e., lutY, lutU, lutV) for the linear color mapping function of the 3D lookup table by inverse quantizing the residual values of the color mapping coefficients, and adding the inverse quantized residual values of the color mapping coefficients to the predicted values of the color mapping coefficients.

In some cases, the values of the color mapping coefficients lutY, lutU and lutV may be limited to a certain range to reduce the computational complexity of generating the 3D lookup table. As one example, the value can be restricted to be in the range of $-2^M$ to $2^M-1$, inclusive, where M is set equal to a predefined fixed value, such as 10 or 12. Alternatively, the value of M may be dependent on one or more of the quantization bit value N, the input bit-depth (i.e., $B_i$) or the output bit-depth (i.e., $B_o$) of the 3D lookup table.

After video encoder 20 and/or video decoder 30 generate the 3D lookup table using one or more the example techniques described above, color prediction may be performed as follows using the 3D lookup table. The input to the color prediction process is a (y,u,v) triplet in one color space, e.g., a first color gamut for a lower or base layer of video data. The output of the color prediction process is a triplet (Y,U,V) in another color space, e.g., a second color gamut for a higher or enhancement layer of video data. First, the smallest octant or cuboid that covers the input triplet (y,u,v) is located in the 3D lookup table. Each of the indexes of the starting vertex of the cuboid are derived as follows:

yIndex=y>>(InputBitDepth−cur_octant_depth−cur_y_part_num_log 2)

uIndex=u>>(InputBitDepth−cur_octant_depth)

vIndex=v>>(InputBitDepth−cur_octant_depth)

In some examples, an additional offset may be applied during the index calculation. Then, another three indexes of the octant or cuboid are derived as (yIndex, uIndex+1, vIndex); (yIndex, uIndex+1, vIndex+1); and (yIndex+1, uIndex+1, vIndex+1). These four vertexes may correspond to the fourth case tetrahedral interpolation (P0, P1, P3, P7), which is illustrated as tetrahedron 156D in FIG. 12. The output triplet (Y,U,V) is then obtained by tetrahedral interpolation, which interpolates the 3D lookup values of the four vertexes. In other examples, other cases of tetrahedral interpolation may be used. Alternatively, all eight vertexes of the octant or cuboid may be derived. In this case, tri-linear interpolation may be used to derive the output triplet (Y, U, V).

In yet another example, a 3D lookup table may be signaled in the SPS or the PPS. Then, in the slice header, an additional flag may be signaled to indicate whether the 3D lookup table will be overwritten for the current slice. Alternatively or/and additionally, a 3D lookup table may be signaled in the SPS and updated in the PPS. It should be noted that common information, such as max_octant_depth, max_y_part_num_log2, input_bit_depth, and output_bit_depth, may only be signaled at the highest level, such as in the SPS or the PPS. Here max_octant_depth and max_y_part_num_log2 denote the maximum supported partition number of the 3D lookup table. In some cases, such information may be profile and/or level related instead of being signaled at the highest level.

As described above, in an additional example, video encoder 20 may conditionally signal a partitioning boundary for at least one of the chroma components (i.e., U or V) of a 3D lookup table to video decoder 30 based on the at least one of the chroma components being partitioned into more than one octant, i.e., the base partition value being greater than one. In some cases, one or both of the chroma components may not be evenly partitioned. In other words, for a given one of the chroma components, at least one of the partitions has a different size than the other partitions. The partitioning boundary defines an uneven partitioning of the one of the chroma components into two or more octants.

Conventionally, partition boundary information for each chroma component is always signaled regardless of whether the chroma component is even partitioned into two or more segments or octants. According to the techniques of this disclosure, in one example, video encoder 20 only signals the partitioning boundary when at least one of the chroma components (i.e., U or V) is partitioned into two or more parts. Otherwise, the partition boundary is unnecessary and is not signaled to the video decoder. In another example, video encoder 20 only signals the partitioning boundary when each of the chroma components (i.e., U and V) is partitioned into two or more parts.

In the example described with respect to Table 7 below, the condition is based on the cur_octant_depth syntax element being equal to 1. As described above with respect to Table 4 above, the cur_octant_depth syntax element indicates a base partition value as the maximal split depth for the 3D lookup table. When the cur_octant_depth syntax element is equal to 1, each of the luma component, the first chroma component, and the second chroma component are partitioned into two segments or octants. In this case, both of the chroma components (i.e., U and V) must be partitioned into two parts to satisfy the condition for signaling partition boundary information. Any edits, additions, or updates to the SHVC WD3, cited above, are indicated by italicized text.

TABLE 7

Color mapping table syntax

| colour_mapping_table( ) { | Descriptor |
|---|---|
| cm_input_luma_bit_depth_minus8 | u(3) |
| cm_input_chroma_bit_depth_delta | se(v) |
| cm_output_luma_bit_depth_minus8 | u(3) |
| cm_output_chroma_bit_depth_delta | se(v) |
| *if(cur octant depth==1) {* | |
| *cb_part_threshold_minus_center* | *se(v)* |
| *cr_part_threshold_minus_center* | *se(v)* |
| *}* | |
| colour_mapping_matrix( ) | |
| } | |

The cb_part_threshold_minus_center syntax element specifies the partition boundary for the first chroma (i.e., Cb) component. When the cb_part_threshold_minus_center syntax element is not present, it is inferred as 0.

The variable CbPartThreshold is set equal to (1<<(cm_input_luma_bit_depth_minus8+cm_input_chroma_bit_depth_delta+7))+cb_part_threshold_minus_center.

When a Cb value is smaller, or no larger, than the variable CbPartThreshold, the Cb value belongs to the first Cb partition. Otherwise, it belongs in the second Cb partition. The cr_part_threshold_minus_center syntax element specifies the partition boundary for the second chroma (i.e., Cr) component. When the cr_part_threshold_minus_center syntax element is not present, it is inferred as 0.

The variable CrPartThreshold is set to (1<<(cm_input_luma_bit_depth_minus8+cm_input_chroma_bit_depth_delta+7))+cr_part_threshold_minus_center.

When a Cr value is smaller, or no larger, than the variable CrPartThreshold, the Cr value belongs to the first Cr partition. Otherwise, it belongs in the second Cr partition. It should be noted that the cb_part_threshold_minus_center and cr_part_threshold_minus_center syntax elements are not quantized prior to coding.

Figure 14:
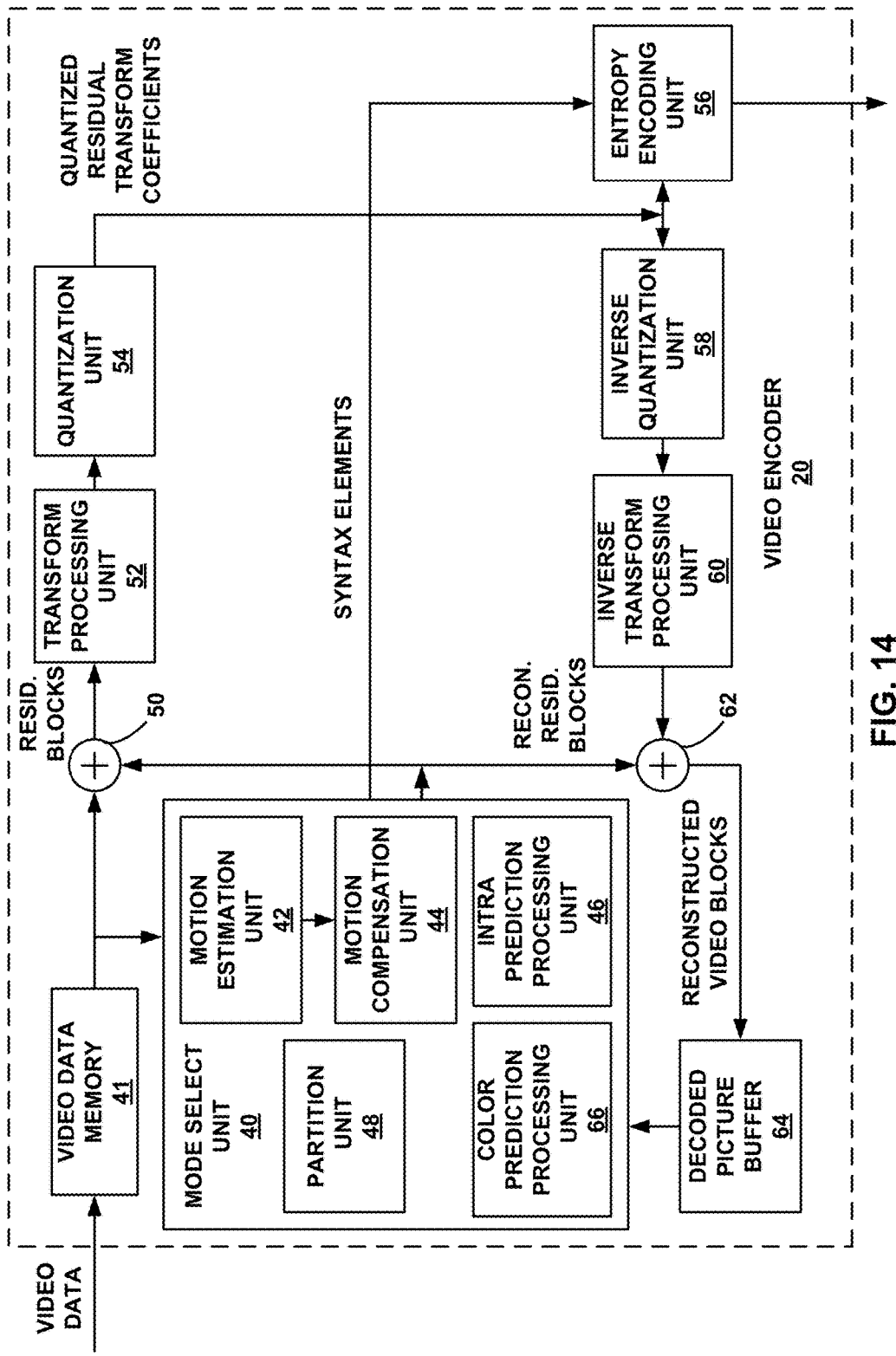
FIG. 14 is a block diagram illustrating an example of a video encoder that may implement techniques for using 3D lookup table based color gamut scalability in multi-layer video coding.

FIG. 14 is a block diagram illustrating an example of video encoder 20 that may implement techniques for using 3D lookup table based color gamut scalability in multi-layer video coding. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 14, video encoder 20 receives a current video block within a video frame to be encoded. In the example of FIG. 14, video encoder 20 includes mode select unit 40, a video data memory 41, decoded picture buffer 64, summer 50, transform processing unit 52, quantization unit 54, and entropy encoding unit 56. Mode select unit 40, in turn, includes motion compensation unit 44, motion estimation unit 42, intra-prediction unit 46, partition unit 48, and color prediction processing unit 66. For video block reconstruction, video encoder 20 also includes inverse quantization unit 58, inverse transform processing unit 60, and summer 62. A deblocking filter (not shown in FIG. 14) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

According to the techniques described in this disclosure, video encoder 20 is configured to perform 3D lookup table based color gamut scalability when encoding multi-layer video data. Video encoder 20 may predict and encode multi-layer video data in accordance any of the SHVC extension, the MV-HEVC extension, and the 3D-HEVC extension, or other multi-layer video coding extensions. Specifically, color prediction processing unit 66 of video encoder 20 may generate inter-layer reference pictures used to predict video blocks in a picture of a higher layer of the video data when a color gamut for the higher layer of the video data is different than a color gamut for a lower layer of video data.

Color prediction processing unit 66 of video encoder 20 may perform color prediction using a 3D lookup table for color gamut scalability to convert color data of a reference picture in a first color gamut for the lower layer of the video data to a second color gamut for the higher layer of the video data. In some examples, color prediction processing unit 66 may generate a separate 3D lookup table for each of the color components, i.e., a luma component, a first chroma component and a second chroma component. Each of the 3D lookup tables includes a luma dimension, a first chroma dimension and a second chroma dimension, and is indexed using the three independent color components.

The techniques of this disclosure relate to signaling of the information used to generate 3D lookup tables for color gamut scalability. In some examples of such techniques, video encoder 20 may encode partition information and/or color values of a 3D lookup table generated for color gamut scalability. The techniques described in this disclosure may be particularly useful in signaling the information used to generate asymmetric and/or unbalanced 3D lookup tables.

In one example of the disclosed techniques, color prediction processing unit 66 of video encoder 20 may generate a 3D lookup table with coarser partitioning for the first and second chroma components and finer partitioning for the luma component. Color prediction processing unit 66 may generate this 3D lookup table by partitioning each of the first chroma, second chroma, and luma color components into a first number of octants according to a base partition value, e.g., a maximal split depth for the 3D lookup table, and then further partitioning each of the first number of octants of the luma component based on a luma partition value. In this way, each of the first and second chroma components of the 3D lookup table are partitioned into fewer octants (i.e., coarser partitioned) and the luma component of the 3D lookup table is partitioned into more octants (i.e., finer partitioned).

As one example, the base partition value is equal to 1 such that each of the color components is partitioned into a single octant, and the luma partition value is equal to 4 such that the single octant of the luma component is partitioned into four octants, which results in a 3D lookup table of size 4×1×1. As another example, the base partition value is equal to 2 such that each of the color components is partitioned into two octants, and the luma partition value is equal to 4 such that each of the two octants of the luma component is partitioned into four octants, which results in a 3D lookup table of size 8×2×2. As can be seen, a lower partition value results in a coarser partitioning (i.e., a smaller number of octants) for a color component.

In some cases, color prediction processing unit 66 generates at least one syntax element (e.g., a first syntax element) indicating the luma partition value. In other cases, the luma partition value may be derived or known at both video encoder 20 and video decoder 30. As one example, color prediction processing unit 66 may derive the luma partition value based at least in part on the base partition value. In some cases, color prediction processing unit 66 may also generate at least one syntax element (e.g., a second syntax element) indicating the base partition value. In other cases, the base partition value may be a predefined value known at both video encoder 20 and video decoder 30. Entropy encoding unit 56 of video encoder 20 may then entropy encode the first and/or second syntax element.

In addition, video encoder 20 may conditionally encode one or more syntax elements indicating a partitioning boundary for at least one of the chroma components. The partitioning boundary defines an uneven partitioning of the one of the chroma components into two or more octants. According to some examples of the techniques of this disclosure, video encoder 20 only encodes the syntax elements indicating the partitioning boundary when at least one of the chroma components is partitioned into more than one octant, i.e., when the base partition value is greater than one. Otherwise, signaling the partition boundary is unnecessary.

In another example of the disclosed techniques, video encoder 20 may generate a 3D lookup table based on a number of octants for each of the luma, first chroma, and second chroma color components, and color values for each of the octants. As described above, in some cases, video encoder 20 may encode at least one syntax element indicating the number of octants for at least one of the color components of the 3D lookup table. Video encoder 20 may also encode the color values for each of the octants for each of the color components. For example, video encoder 20 may encode color mapping coefficients for a linear color mapping function of the color values in the 3D lookup table. The linear color mapping function is used to convert color data in the first color gamut for the lower layer of video data to the second color gamut for the higher layer of video data. The color mapping coefficients for the linear color mapping function are weighting factors between color components of the lower and higher layers of the video data. For each of the color components, one of the color mapping coefficients may be a key coefficient that defines a weighting factor between the same color component of the lower and higher layers of the video data.

The color mapping coefficients for the linear color mapping function may be derived as floating point values. Prior to encoding the color mapping coefficients, color prediction processing unit 66 of video encoder 20 may convert the floating point values of the color mapping coefficients to integer values. The conversion may use a bit-depth for the integer values based on at least one of an input bit-depth or an output bit-depth of the 3D lookup table. In addition, color prediction processing unit 66 may restrict the values of the color mapping coefficients to be within a given range based on a predefined fixed value or a value dependent on at least one of an input bit-depth or an output bit-depth of the 3D lookup table.

In some examples of the techniques of this disclosure, color prediction processing unit 66 may predict one or more of the color mapping coefficients in order to encode residual values between original values of the color mapping coefficients and the predicted values of the color mapping coefficients. For example, for a first octant for each of the color components, color prediction processing unit 66 may predict the color mapping coefficients of the linear color mapping function based on predefined fixed values. In one example, for a first octant for each of the color components, color prediction processing unit 66 may encode a key coefficient of the linear color mapping function based on a predicted value equal to a predefined non-zero value, and encode any remaining color mapping coefficients of the linear color mapping function based on a predicted value equal to zero. In this example, color prediction processing unit 66 may encode the color mapping coefficients of any remaining octants for each of the color components based on predicted values from at least one previously encoded octant, such as the first octant.

Entropy encoding unit 56 of video encoder 20 may then entropy encode the residual values of the color mapping coefficients for the linear color mapping function for each of the octants for each of the color components. In some cases, prior to entropy encoding, video encoder 20 may quantize the residual values of the color mapping coefficients using quantization unit 54 based on a determined quantization value. Video encoder 20 may encode the determined quantization value.

Upon generating the 3D lookup table, color prediction processing unit 66 performs color prediction of a reference picture for the lower layer of the video data using the 3D lookup table, and generates at least one inter-layer reference picture for the higher layer of the video data based on the color predicted reference picture. Upon generating the inter-layer reference picture, motion compensation unit 44 of video encoder 20 may operate as described above to predict video blocks in a picture of the higher layer of the video data based on the inter-layer reference pictures generated using the 3D lookup table. Video encoder 20 may then encode residual data of the video blocks in a bitstream for transmission to video decoder 30.

Figure 15:
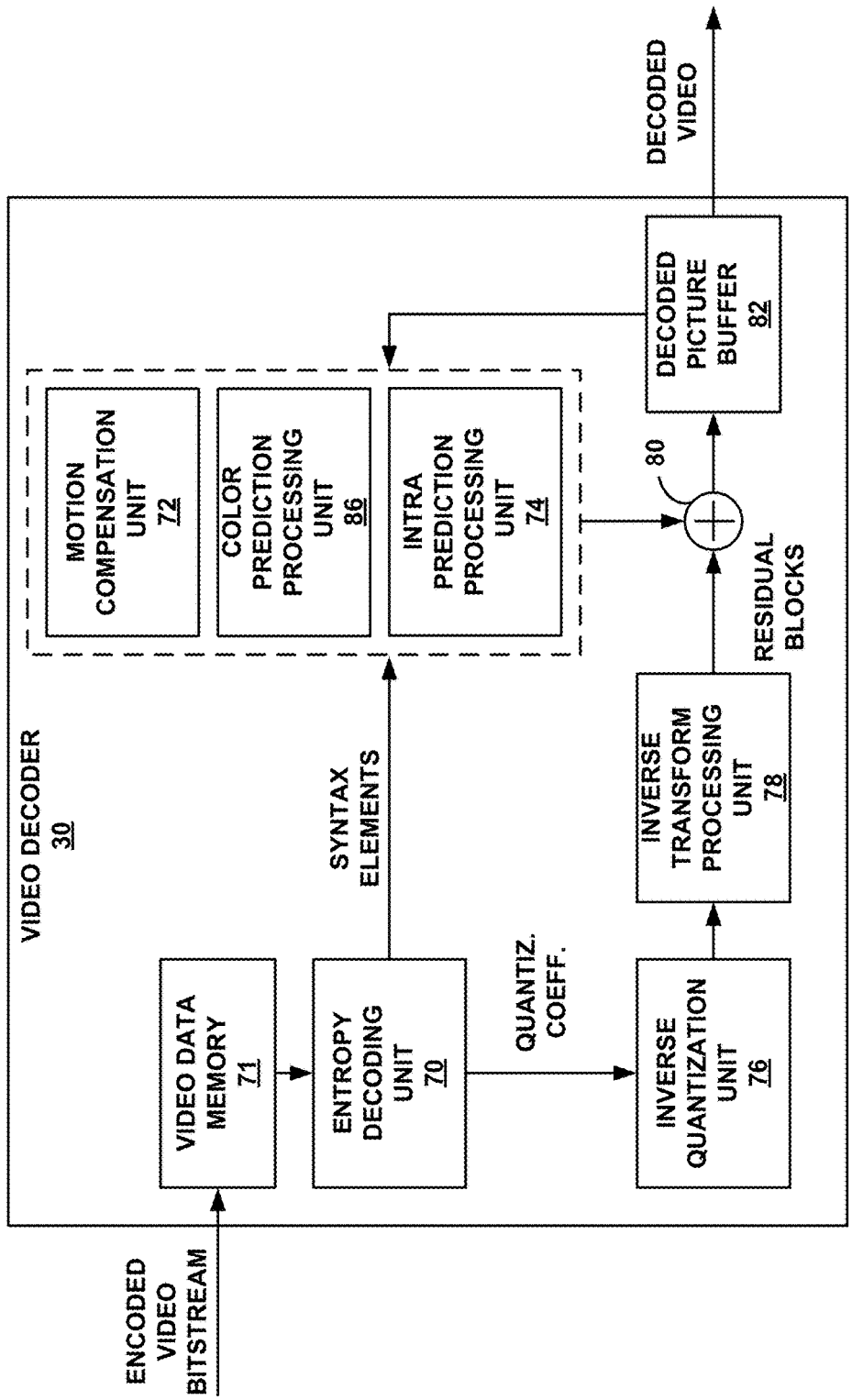
FIG. 15 is a block diagram illustrating an example of a video decoder that may implement techniques for using 3D lookup table based color gamut scalability in multi-layer video coding.

FIG. 15 is a block diagram illustrating an example of video decoder 30 that may implement techniques for determining using 3D lookup table based color gamut scalability in multi-layer video coding. In the example of FIG. 15, video decoder 30 includes an entropy decoding unit 70, a video data memory 71, motion compensation unit 72, intra prediction processing unit 74, color prediction processing unit 86, inverse quantization unit 76, inverse transform processing unit 78, decoded picture buffer 82 and summer 80. Video decoder 30 may, in some examples, perform a decoding pass generally reciprocal to the encoding pass described with respect to video encoder 20 (FIG. 14). Motion compensation unit 72 may generate prediction data based on motion vectors received from entropy decoding unit 70, while intra-prediction unit 74 may generate prediction data based on intra-prediction mode indicators received from entropy decoding unit 70.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRA\4), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

According to some examples of the techniques described in this disclosure, video decoder 30 is configured to perform 3D lookup table based color gamut scalability when decoding multi-layer video data. Video decoder 30 may decode and reconstruct predicted multi-layer video data in accordance any of the SHVC extension, the MV-HEVC extension, the 3D-HEVC extension, or other multi-layer video coding extensions to HEVC. Specifically, color prediction processing unit 86 of video decoder 30 may generate inter-layer reference pictures used to predict video blocks in a picture of a higher layer of the video data when a color gamut for the higher layer of the video data is different than a color gamut for a lower layer of video data.

Color prediction processing unit 86 of video decoder 30 may perform color prediction using a 3D lookup table for color gamut scalability to convert color data of a reference picture in a first color gamut for the lower layer of the video data to a second color gamut for the higher layer of the video data. In some examples, color prediction processing unit 86 may generate a separate 3D lookup table for each of the color components, i.e., a luma component, a first chroma component and a second chroma component. Each of the 3D lookup tables includes a luma dimension, a first chroma dimension and a second chroma dimension, and is indexed using the three independent color components.

The techniques of this disclosure relate to signaling of the information used to generate 3D lookup tables for color gamut scalability. According to the techniques, video decoder 30 may decode partition information and/or color values to generate a 3D lookup table in order to perform color gamut scalability. The techniques described in this disclosure may be particularly useful in signaling the information used to generate asymmetric and/or unbalanced 3D lookup tables.

In one example of the disclosed techniques, color prediction processing unit 86 of video decoder 30 may generate a 3D lookup table with coarser partitioning for the first and second chroma components and finer partitioning for the luma component. Color prediction processing unit 86 may generate this 3D lookup table by partitioning each of the first chroma, second chroma, and luma color components into a first number of octants according to a base partition value, e.g., a maximal split depth for the 3D lookup table, and then further partitioning each of the first number of octants of the luma component based on a luma partition value. In this way, each of the first and second chroma components of the 3D lookup table are partitioned into fewer octants (i.e., coarser partitioned) and the luma component of the 3D lookup table is partitioned into more octants (i.e., finer partitioned).

As one example, the base partition value is equal to 1 such that each of the color components is partitioned into a single octant, and the luma partition value is equal to 4 such that the single octant of the luma component is partitioned into four octants, which results in a 3D lookup table of size 4×1×1. As another example, the base partition value is equal to 2 such that each of the color components is partitioned into two octants, and the luma partition value is equal to 4 such that each of the two octants of the luma component is partitioned into four octants, which results in a 3D lookup table of size 8×2×2. As can be seen, a lower partition value results in a coarser partitioning (i.e., a smaller number of octants) for a color component.

In some cases, entropy decoding unit 70 of video decoder 30 entropy decodes at least one syntax element (e.g., a first syntax element) indicating the luma partition value. In other cases, the luma partition value may be derived or known at both video encoder 20 and video decoder 30. As one example, color prediction processing unit 86 may derive the luma partition value based at least in part on the base partition value. In some cases, entropy decoding unit 70 may also decode at least one syntax element (e.g., a second syntax element) indicating the base partition value. In other cases, the base partition value may be a predefined value known at both video encoder 20 and video decoder 30. Color prediction processing unit 86 uses the predefined or signaled base partition value and the derived or signaled luma partition value to generate the 3D lookup table with coarser partitioning for the first and second chroma components and finer partitioning for the luma component, as described above.

In addition, video decoder 30 may conditionally decode one or more syntax elements indicating a partitioning boundary for at least one of the chroma components. The partitioning boundary defines an uneven partitioning of the one of the chroma components into two or more octants. According to the techniques of this disclosure, video decoder 30 only decodes the syntax elements indicating the partitioning boundary when at least one of the chroma components is partitioned into more than one octant, i.e., when the base partition value is greater than one. Otherwise, decoding the partition boundary is unnecessary.

In another example of the disclosed techniques, video decoder 30 may generate a 3D lookup table based on a number of octants for each of the luma, first chroma, and second chroma color components, and color values for each of the octants. As described above, in some cases, video decoder 30 may decode at least one syntax element indicating the number of octants for at least one of the color components of the 3D lookup table, or otherwise determine the number of octants for each of the color components of the 3D lookup table. Video decoder 30 may also decode the color values for each of the octants for each of the color components. For example, video decoder 30 may decode color mapping coefficients for a linear color mapping function of the color values in the 3D lookup table. The linear color mapping function is used to convert color data in the first color gamut for the lower layer of video data to the second color gamut for the higher layer of video data. The color mapping coefficients for the linear color mapping function are weighting factors between color components of the lower and higher layers of the video data. For each of the color components, one of the color mapping coefficients may be a key coefficient that defines a weighting factor between the same color component of the lower and higher layers of the video data.

The color mapping coefficients for the linear color mapping function are first derived as floating point values. The floating point values are then converted or quantized to integer values are signaled as integer values. The conversion may use a bit-depth for the integer values based on at least one of an input bit-depth or an output bit-depth of the 3D lookup table. In addition, color prediction processing unit 86 may restrict the values of the color mapping coefficients to be within a given range based on a predefined fixed value or a value dependent on at least one of an input bit-depth or an output bit-depth of the 3D lookup table.

Entropy decoding unit 70 of video decoder 30 may entropy decode residual values of the color mapping coefficients for the linear color mapping function for each of the octants for each of the color components. In some cases, after entropy decoding and prior to reconstruction, video decoder 30 may inverse quantize the residual values of the color mapping coefficients using inverse quantization unit 76 based on a determined quantization value. Video decoder 30 may decode a syntax element indicating the determined quantization value.

According to the techniques of this disclosure, color prediction processing unit 86 may predict one or more of the color mapping coefficients in order to reconstruct values of the color mapping coefficients based on the residual values of the color mapping coefficients and the predicted values of the color mapping coefficients. For example, for a first octant for each of the color components, color prediction processing unit 86 may predict the color mapping coefficients of the linear color mapping function based on predefined fixed values. In one example, for a first octant for each of the color components, color prediction processing unit 86 may decode a key coefficient of the linear color mapping function based on a predicted value equal to a predefined non-zero value, and decode any remaining color mapping coefficients of the linear color mapping function based on a predicted value equal to zero. In this example, color prediction processing unit 86 may decode the color mapping coefficients of any remaining octants for each of the color components based on predicted values from at least one previously decoded octant, such as the first octant.

Upon generating the 3D lookup table, color prediction processing unit 86 performs color prediction of a reference picture for the lower layer of the video data using the 3D lookup table, and generates an inter-layer reference picture for the higher layer of the video data based on the color predicted reference picture. Upon generating the inter-layer reference pictures, motion compensation unit 72 of video decoder 30 may operate as described above to reconstruct video blocks in a picture of the higher layer of the video data based on decoded residual data and the inter-layer reference pictures generated using the 3D lookup table.

Figure 16:
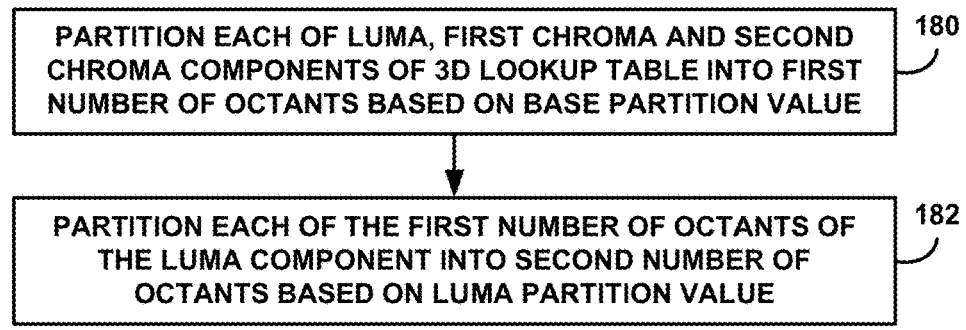
FIG. 16 is a flowchart illustrating an example operation of encoding partition information for at least one of the color components of a 3D lookup table.

FIG. 16 is a flowchart illustrating an example operation of encoding partition information for at least one of the color components of a 3D lookup table. The example operation of FIG. 16 is described herein as being performed by color prediction processing unit 66 of video encoder 20 of FIG. 14. In other examples, the operation may be performed by color prediction processing unit 144 of FIG. 8.

According to the techniques of this disclosure, color prediction processing unit 66 of video encoder 20 may generate a 3D lookup table with coarser partitioning for the first and second chroma components and finer partitioning for the luma component. Color prediction processing unit 66 may generate this 3D lookup table by partitioning each of the luma, first chroma, and second chroma components of the 3D lookup table into a first number of octants based on a base partition value (180). In one example, the base partition value may be a maximal split depth for the 3D lookup table. Color prediction processing unit 66 then further partitions each of the first number octants of the luma component into a second number of octants based on a luma partition value (182).

In some cases, video encoder 20 may encode at least one syntax element (e.g., a first syntax element) indicating the luma partition value for the luma component of the 3D lookup table. In other cases, the luma partition value may be derived or known at both video encoder 20 and video decoder 30. In some cases, video encoder 20 may also generate at least one additional syntax element (e.g., a second syntax element) indicating the base partition value for the 3D lookup table. In other cases, the base partition value may be a predefined value known at both video encoder 20 and video decoder 30.

In addition, video encoder 20 may conditionally encode one or more syntax elements indicating a partitioning boundary for at least one of the chroma components. The partitioning boundary defines an uneven partitioning of the one of the chroma components into two or more octants. According to the techniques of this disclosure, video encoder 20 encodes the syntax elements indicating the partitioning boundary for at least one of the chroma components based on the one of the chroma components being partitioned into more than one octant, i.e., the base partition value being greater than one.

Video encoder 20 may also encode color values for each of the octants for each of the color components. For example, video encoder 20 may encode color values of vertexes for each of the octants of each of the color components. As another example, video encoder 20 may encode color mapping coefficients for a linear color mapping function of the color values in the 3D lookup table. In this way, a video decoder, such as video decoder 30 from FIG. 15, may generate a 3D lookup table based on the signaled partition information and signaled color values in order to perform color gamut scalability to decode multi-layer video data.

Figure 17:
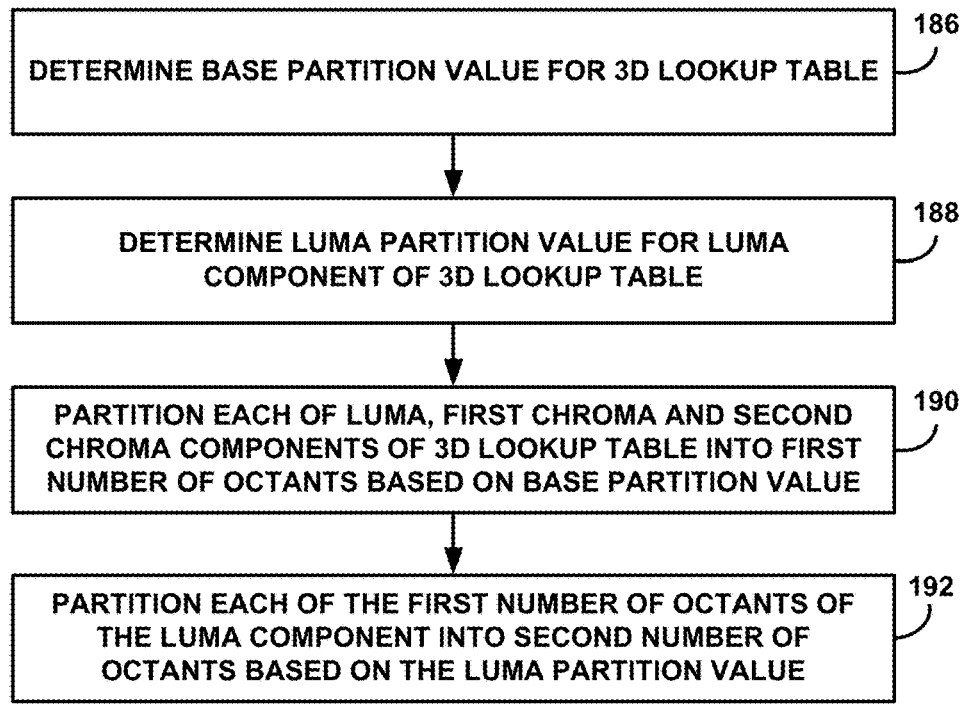
FIG. 17 is a flowchart illustrating an example operation of decoding partition information for at least one of the color components of a 3D lookup table.

FIG. 17 is a flowchart illustrating an example operation of decoding partition information for at least one of the color components of a 3D lookup table. The example operation of FIG. 17 is described herein as being performed by color prediction processing unit 86 of video decoder 30 of FIG. 15. In other examples, the operation may be performed by color prediction processing unit 144 of FIG. 8.

According to the techniques of this disclosure, video decoder 30 determines a base partition value for the 3D lookup table (186). In some cases, video decoder 30 may decode, from a received bitstream, at least one syntax element (e.g., a second syntax element) indicating the base partition value. In other cases, the base partition value may be a predefined value known at both video encoder 20 and video decoder 30. Video decoder 30 also determines a luma partition value for a luma component of the 3D lookup table (188). In some cases video decoder 30 may decode, from the received bitstream, at least one syntax element (e.g., a first syntax element) indicating the luma partition value. In other cases, video decoder 30 may derive the luma partition value. In one example, video decoder 30 may derive the luma partition value based at least in part on the base partition value.

Color prediction processing unit 86 of video decoder 30 uses the base partition value and the luma partition value to generate the 3D lookup table with coarser partitioning for the first and second chroma components and finer partitioning for the luma component. Color prediction processing unit 86 may generate this 3D lookup table by partitioning each of the luma, first chroma, and second chroma components of the 3D lookup table into a first number of octants based on the base partition value (190). In one example, the base partition value may be a maximal split depth for the 3D lookup table. Color prediction processing unit 86 then further partitions each of the first number of octants of the luma component into a second number of octants based on a luma partition value (192). In this manner, the luma component may be partitioned to have a greater number of octants than each of the chroma components.

In addition, video decoder 30 may conditionally decode one or more syntax elements indicating a partitioning boundary for at least one of the chroma components. The partitioning boundary defines an uneven partitioning of the one of the chroma components into two or more octants. According to the techniques of this disclosure, video decoder 30 decodes the syntax elements indicating the partitioning boundary for at least one of the chroma components based on the one of the chroma components being partitioned into more than one octant, i.e., the base partition value being greater than one.

Video decoder 30 may also decode color values for each of the octants for each of the color components. For example, video decoder 30 may decode color values of vertexes for each of the octants of each of the color components. As another example, video decoder 30 may decode color mapping coefficients for a linear color mapping function of the color values in the 3D lookup table. In this way, video decoder 30 may generate a 3D lookup table based on the signaled partition information and signaled color values in order to perform color gamut scalability to decode multi-layer video data.

Figure 18:
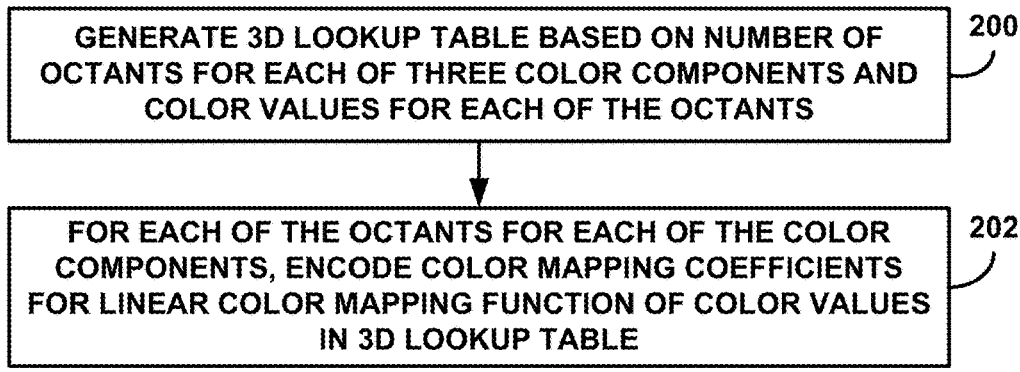
FIG. 18 is a flowchart illustrating an example operation of encoding color values for each of the octants for each of the color components of a 3D lookup table.

FIG. 18 is a flowchart illustrating an example operation of encoding color values for each of the octants for each of the color components of a 3D lookup table. The example operation of FIG. 18 is described herein as being performed by color prediction processing unit 66 of video encoder 20 of FIG. 14. In other examples, the operation may be performed by color prediction processing unit 144 of FIG. 8.

According to the techniques of this disclosure, video encoder 20 may generate a 3D lookup table based on a number of octants for each of the luma, first chroma, and second chroma color components, and color values for each of the octants (200). Video encoder 20 may encode the color values for each of the octants for each of the color components. More specifically, for each of the octants for each of the color components, video encoder 20 may encode color mapping coefficients for a linear color mapping function of the color values in the 3D lookup table (202).

Prior to encoding the color mapping coefficients, color prediction processing unit 66 of video encoder 20 may convert floating point values of the color mapping coefficients to integer values using a bit-depth based on at least one of an input bit-depth or an output bit-depth of the 3D lookup table. In addition, color prediction processing unit 66 may restrict the values of the color mapping coefficients to be within a given range based on a predefined fixed value or a value dependent on at least one of an input bit-depth or an output bit-depth of the 3D lookup table.

Color prediction processing unit 66 may predict one or more of the color mapping coefficients in order to encode residual values between original values of the color mapping coefficients and the predicted values of the color mapping coefficients. For example, for a first octant for each of the color components, color prediction processing unit 66 may encode a key coefficient of the linear color mapping function based on a predicted value equal to a predefined non-zero value, and encode any remaining color mapping coefficients of the linear color mapping function based on a predicted value equal to zero. In this example, color prediction processing unit 66 may encode the color mapping coefficients of any remaining octants for each of the color components based on predicted values from at least one previously encoded octant, such as the first octant. In some cases, prior to encoding the residual values of the color mapping coefficients, video encoder 20 may quantize the residual values of the color mapping coefficients based on a determined quantization value.

Video encoder 20 may also encode at least one syntax element indicating the number of octants for at least one of the color components of the 3D lookup table. In this way, a video decoder, such as video decoder 30 from FIG. 15, may generate a 3D lookup table based on the signaled partition information and the signaled color values in order to perform color gamut scalability to decode multi-layer video data.

Figure 19:
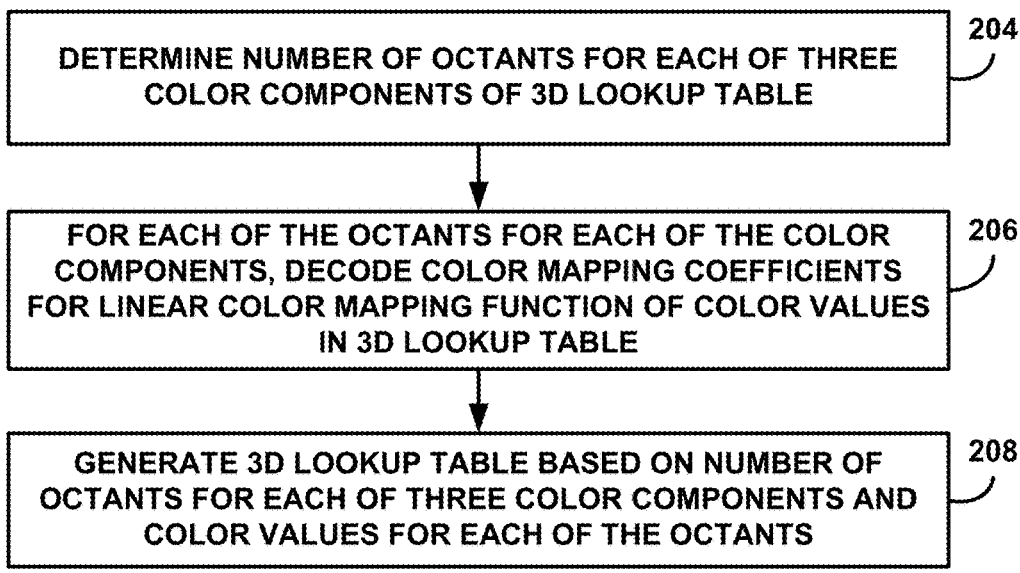
FIG. 19 is a flowchart illustrating an example operation of decoding color values for each of the octants for each of the color components of a 3D lookup table.

FIG. 19 is a flowchart illustrating an example operation of decoding color values for each of the octants for each of the color components of a 3D lookup table. The example operation of FIG. 19 is described herein as being performed by color prediction processing unit 86 of video decoder 30 of FIG. 15. In other examples, the operation may be performed by color prediction processing unit 144 of FIG. 8.

According to some examples of the techniques of this disclosure, video decoder 30 determines a number of octants for each of the luma, first chroma, and second chroma color components of the 3D lookup table (204). In some cases, video decoder 30 may decode, from a received bitstream, at least one syntax element indicating the number of octants for at least one of the color components of the 3D lookup table. Video decoder 30 also decodes color values for each of the octants for each of the color components. More specifically, for each of the octants for each of the color components, video decoder 30 may decode color mapping coefficients for a linear color mapping function of the color values in the 3D lookup table (206). Color prediction processing unit 86 of video decoder 30 then generates the 3D lookup table based on the number of octants for each of the luma, first chroma, and second chroma color components, and the color values associated with the color mapping coefficients for each of the octants (208). Video decoder 30 may use the 3D lookup table to perform color gamut scalability to decode multi-layer video data.

Video decoder 30 may receive residual values of the color mapping coefficients for the linear color mapping function for each of the octants for each of the color components. In some cases, after decoding the residual values of the color mapping coefficients, video decoder 30 may inverse quantize the residual values of the color mapping coefficients based on a determined quantization value. Color prediction processing unit 86 may then predict one or more of the color mapping coefficients in order to reconstruct values of the color mapping coefficients based on the signaled residual values of the color mapping coefficients and the predicted values of the color mapping coefficients. For example, for a first octant for each of the color components, color prediction processing unit 86 may decode a key coefficient of the linear color mapping function based on a predicted value equal to a predefined non-zero value, and decode any remaining color mapping coefficients of the linear color mapping function based on a predicted value equal to zero. In this example, color prediction processing unit 86 may decode the color mapping coefficients of any remaining octants for each of the color components based on predicted values from at least one previously decoded octant, such as the first octant.

After decoding the color mapping coefficients, the color mapping coefficients may be integer values that represent floating point values using a bit-depth based on at least one of an input bit-depth or an output bit-depth of the 3D lookup table. Color prediction processing unit 86 may restrict the values of the color mapping coefficients to be within a given range based on a predefined fixed value or a value dependent on at least one of an input bit-depth or an output bit-depth of the 3D lookup table.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a number of octants for each of three color components of a three-dimensional (3D) lookup table for color gamut scalability;
   determining a quantization value for residual values of the color mapping coefficients;
   for each of the octants for each of the color components, decoding color mapping coefficients for a linear color mapping function of color values in the 3D lookup table used to convert color data in a first color gamut for a lower layer of the video data to a second color gamut for a higher layer of the video data, wherein decoding the color mapping coefficients further comprises:
      for each of the octants for each of the color components, decoding residual values of the color mapping coefficients;
      inverse quantizing the residual values of the color mapping coefficients based on the determined quantization value; and
      reconstructing the color mapping coefficients based on the decoded residual values and predicted values of the color mapping coefficients;
   generating the 3D lookup table based on the number of octants for each of the color components and color values associated with the color mapping coefficients for each of the octants;
   decoding residual data of video blocks of the video data; and
   reconstructing the video blocks of the video data based on the decoded residual data and at least one reference picture generated using the 3D lookup table.

2. The method of claim 1, wherein the color mapping coefficients comprise integer values that represent floating point values using a bit-depth based on at least one of an input bit-depth or an output bit-depth of the 3D lookup table.

3. The method of claim 1, wherein decoding the color mapping coefficients comprises, for a first one of the octants for each of the color components, decoding at least one coefficient of the color mapping coefficients based on a predicted value of the at least one coefficient of the color mapping coefficients.

4. The method of claim 3, wherein the predicted value of the at least one coefficient of the color mapping coefficients is a predefined fixed value.

5. The method of claim 3, wherein the at least one coefficient of the color mapping coefficients comprises a key coefficient that defines a weighting factor for the linear color mapping function between a same color component of the lower layer of the video data and the higher layer of the video data.

6. The method of claim 5, wherein decoding the color mapping coefficients further comprises, for the first one of the octants for each of the color components, decoding the key coefficient based on a predicted value equal to a predefined non-zero value, and decoding remaining coefficients of the color mapping coefficients based on a predicted value equal to zero.

7. The method of claim 3, wherein decoding the color mapping coefficients further comprises, for each remaining one of the octants for each of the color components, decoding the color mapping coefficients based on predicted values from at least one previously decoded octant.

8. The method of claim 1, wherein determining the quantization value for residual values of the color mapping coefficients comprises decoding at least one syntax element indicating the quantization value.

9. The method of claim 1, further comprising restricting values of the color mapping coefficients to a range based on one of a predefined fixed value or a value dependent on at least one of an input bit-depth or an output bit-depth of the 3D lookup table.

10. The method of claim 1, wherein determining the number of octants for each of the color components comprises decoding at least one syntax element indicating the number of octants for at least one of the color components of the 3D lookup table.

11. The method of claim 1, further comprising:
   performing color prediction using the 3D lookup table to convert color data of a reference picture in the first color gamut for the lower layer of the video data to the second color gamut for the higher layer of the video data;
   generating at least one inter-layer reference picture for the higher layer of the video data based on the converted color data;
   decoding residual data of video blocks; and
   reconstructing the video blocks in a picture of the higher layer of the video data based on the decoded residual data and the at least one inter-layer reference picture generated using the 3D lookup table.

12. A method of encoding video data, the method comprising:
generating a three-dimensional (3D) lookup table for color gamut scalability based on a number of octants for each of three color components and color values for each of the octants;
determining a quantization value for residual values of the color mapping coefficients;
for each of the octants for each of the color components, encoding color mapping coefficients for a linear color mapping function of the color values in the 3D lookup table used to convert color data in a first color gamut for a lower layer of the video data to a second color gamut for a higher layer of the video data, wherein encoding the color mapping coefficients further comprises:
for each of the octants for each of the color components, calculating residual values of the color mapping coefficients based on original values of the color mapping coefficients and predicted values of the color mapping coefficients;
quantizing the residual values of the color mapping coefficients based on the determined quantization value;
encoding the residual values of the color mapping coefficients;
predicting video blocks of the video data based on at least one reference picture generated using the 3D lookup table; and
encoding residual data of the video blocks in a bitstream.

13. The method of claim 12, further comprising, prior to encoding the color mapping coefficient, converting floating point values of the color mapping coefficients to integer values using a bit-depth based on at least one of an input bit-depth or an output bit-depth of the 3D lookup table.

14. The method of claim 12, wherein encoding the color mapping coefficients comprises, for a first one of the octants for each of the color components, encoding at least one coefficient of the color mapping coefficients based on a predicted value of the at least one coefficient of the color mapping coefficients.

15. The method of claim 14, wherein the predicted value of the at least one coefficient of the color mapping coefficients is a predefined fixed value.

16. The method of claim 14, wherein the at least one coefficient of the color mapping coefficients comprises a key coefficient that defines a weighting factor for the linear color mapping function between a same color component of the lower layer of the video data and the higher layer of the video data.

17. The method of claim 16, wherein encoding the color mapping coefficients further comprises, for the first one of the octants for each of the color components, encoding the key coefficient based on a predicted value equal to a predefined non-zero value, and encoding remaining coefficients of the color mapping coefficients based on a predicted value equal to zero.

18. The method of claim 14, wherein encoding the color mapping coefficients further comprises, for each remaining one of the octants for each of the color components, encoding the color mapping coefficients based on predicted values from at least one previously encoded octant.

19. The method of claim 18, further comprising encoding at least one syntax element indicating the determined quantization value for residual values of the color mapping coefficients.

20. The method of claim 12, further comprising restricting values of the color mapping coefficients to a range based on one of a predefined fixed value or a value dependent on at least one of an input bit-depth or an output bit-depth of the 3D lookup table.

21. The method of claim 12, further comprising encoding at least one syntax element indicating the number of octants for at least one of the color components of the 3D lookup table.

22. The method of claim 12, further comprising:
performing color prediction using the 3D lookup table to convert color data of a reference picture in the first color gamut for the lower layer of the video data to the second color gamut for the higher layer of the video data;
generating at least one inter-layer reference picture for the higher layer of the video data based on the converted color data;
predicting video blocks in a picture of the higher layer of the video data based on the at least one inter-layer reference picture generated using the 3D lookup table; and
encoding residual data of the video blocks in a bitstream.

23. A video decoding device comprising:
a memory configured to store video data; and
one or more processors in communication with the memory and configured to:
determine a number of octants for each of three color components of a three-dimensional (3D) lookup table for color gamut scalability of the video data,
determine a quantization value for residual values of the color mapping coefficients,
for each of the octants for each of the color components, decode color mapping coefficients for a linear color mapping function of color values in the 3D lookup table used to convert color data in a first color gamut for a lower layer of the video data to a second color gamut for a higher layer of the video data, wherein to decode the color mapping coefficients, the one or more processors are further configured to:
for each of the octants for each of the color components, decode residual values of the color mapping coefficients,
inverse quantize the residual values of the color mapping coefficients based on the determined quantization value, and
reconstruct the color mapping coefficients based on the decoded residual values and predicted values of the color mapping coefficients,
generate the 3D lookup table based on the number of octants for each of the color components and color values associated with the color mapping coefficients for each of the octants,
decode residual data of video blocks of the video data, and
reconstruct the video blocks of the video data based on the decoded residual data and at least one reference picture generated using the 3D lookup table.

24. The device of claim 23, wherein the color mapping coefficients comprise integer values that represent floating point values using a bit-depth based on at least one of an input bit-depth or an output bit-depth of the 3D lookup table.

25. The device of claim 23, wherein the one or more processors are configured to, for a first one of the octants for each of the color components, decode at least one coefficient of the color mapping coefficients based on a predicted value of the at least one coefficient of the color mapping coefficients.

26. The device of claim 25, wherein the predicted value of the at least one coefficient of the color mapping coefficients is a predefined fixed value.

27. The device of claim 25, wherein the at least one coefficient of the color mapping coefficients comprises a key coefficient that defines a weighting factor for the linear color mapping function between a same color component of the lower layer of the video data and the higher layer of the video data.

28. The device of claim 27, wherein the one or more processors are configured to, for the first one of the octants for each of the color components, decode the key coefficient based on a predicted value equal to a predefined non-zero value, and decode remaining coefficients of the color mapping coefficients based on a predicted value equal to zero.

29. The device of claim 25, wherein the one or more processors are configured to, for each remaining one of the octants for each of the color components, decode the color mapping coefficients based on predicted values from at least one previously decoded octant.

30. The device of claim 29, wherein, to determine the quantization value for residual values of the color mapping coefficients, the one or more processors are configured to decode at least one syntax element indicating the quantization value.

31. The device of claim 23, wherein the one or more processors are configured to restrict values of the color mapping coefficients to a range based on one of a predefined fixed value or a value dependent on at least one of an input bit-depth or an output bit-depth of the 3D lookup table.

32. The device of claim 23, wherein, to determine the number of octants for each of the color components, the one or more processors are configured to decode at least one syntax element indicating the number of octants for at least one of the color components of the 3D lookup table.

33. The device of claim 23, wherein the one or more processors are configured to:
perform color prediction using the 3D lookup table to convert color data of a reference picture in the first color gamut for the lower layer of the video data to the second color gamut for the higher layer of the video data;
generate at least one inter-layer reference picture for the higher layer of the video data based on the converted color data;
decode residual data of video blocks; and
reconstruct the video blocks in a picture of the higher layer of the video data based on the decoded residual data and the at least one inter-layer reference picture generated using the 3D lookup table.

34. A video encoding device comprising:
a memory configured to store video data; and
one or more processors in communication with the memory and configured to:
generate a three-dimensional (3D) lookup table for color gamut scalability of the video data based on a number of octants for each of three color components and color values for each of the octants,
determine a quantization value for residual values of the color mapping coefficients,
for each of the octants for each of the color components, encode color mapping coefficients for a linear color mapping function of the color values in the 3D lookup table used to convert color data in a first color gamut for a lower layer of the video data to a second color gamut for a higher layer of the video data,
wherein to encode the color mapping coefficients, the one or more processors are further configured to:
for each of the octants for each of the color components, calculate residual values of the color mapping coefficients based on original values of the color mapping coefficients and predicted values of the color mapping coefficients,
quantize the residual values of the color mapping coefficients based on the determined quantization value, and
encode the residual values of the color mapping coefficients,
predict video blocks of the video data based on at least one reference picture generated using the 3D lookup table, and
encode residual data of the video blocks in a bitstream.

35. The device of claim 34, wherein, prior to encoding the color mapping coefficients, the one or more processors are configured to convert floating point values of the color mapping coefficients to integer values using a bit-depth based on at least one of an input bit-depth or an output bit-depth of the 3D lookup table.

36. The device of claim 34, wherein the one or more processors are configured to, for a first one of the octants for each of the color components, encode at least one coefficient of the color mapping coefficients based on a predicted value of the at least one coefficient of the color mapping coefficients.

37. The device of claim 36, wherein the predicted value of the at least one coefficient of the color mapping coefficients is a predefined fixed value.

38. The device of claim 36, wherein the at least one coefficient of the color mapping coefficients comprises a key coefficient that defines a weighting factor for the linear color mapping function between a same color component of the lower layer of the video data and the higher layer of the video data.

39. The device of claim 38, wherein the one or more processors are configured to, for the first one of the octants for each of the color components, encode the key coefficient based on a predicted value equal to a predefined non-zero value, and encode remaining coefficients of the color mapping coefficients based on a predicted value equal to zero.

40. The device of claim 39, wherein the one or more processors are configured to, for each remaining one of the octants for each of the color components, encode the color mapping coefficients based on predicted values from at least one previously encoded octant.

41. The device of claim 40, wherein the one or more processors are configured to encode at least one syntax element indicating the determined quantization value.

42. The device of claim 34, wherein the one or more processors are configured to restrict values of the color mapping coefficients to a range based on one of a predefined fixed value or a value dependent on at least one of an input bit-depth or an output bit-depth of the 3D lookup table.

43. The device of claim 34, wherein the one or more processors are configured to encode at least one syntax element indicating the number of octants for at least one of the color components of the 3D lookup table.

44. The device of claim 34, wherein the one or more processors are configured to:
perform color prediction using the 3D lookup table to convert color data of a reference picture in the first color gamut for the lower layer of the video data to the second color gamut for the higher layer of the video data;

generate at least one inter-layer reference picture for the higher layer of the video data based on the converted color data;

predict video blocks in a picture of the higher layer of the video data based on the at least one inter-layer reference picture generated using the 3D lookup table; and encode residual data of the video blocks in a bitstream.

45. A video decoding device comprising:

means for determining a number of octants for each of three color components of a three-dimensional (3D) lookup table for color gamut scalability;

means for determining a quantization value for residual values of the color mapping coefficients;

means for decoding, for each of the octants for each of the color components, color mapping coefficients for a linear color mapping function of color values in the 3D lookup table used to convert color data in a first color gamut for a lower layer of the video data to a second color gamut for a higher layer of the video data, wherein the means for decoding the color mapping coefficients comprise:

means for decoding, for each of the octants for each of the color components, residual values of the color mapping coefficients;

means for inverse quantizing the residual values of the color mapping coefficients based on the determined quantization value; and means for reconstructing the color mapping coefficients based on the decoded residual values and predicted values of the color mapping coefficients means for generating the 3D lookup table based on the number of octants for each of the color components and color values associated with the color mapping coefficients for each of the octants;

means for decoding residual data of video blocks of the video data; and means for reconstructing the video blocks of the video data based on the decoded residual data and at least one reference picture generated using the 3D lookup table.

46. A non-transitory computer-readable storage medium storing instructions for decoding video data that, when executed, cause one or more processors to:

determine a number of octants for each of three color components of a three-dimensional (3D) lookup table for color gamut scalability;

determine a quantization value for residual values of the color mapping coefficients;

for each of the octants for each of the color components, decode color mapping coefficients for a linear color mapping function of color values in the 3D lookup table used to convert color data in a first color gamut for a lower layer of the video data to a second color gamut for a higher layer of the video data, wherein the instructions that cause the processor to decode the color mapping coefficients comprise instructions that cause the processor to:

for each of the octants for each of the color components, decode residual values of the color mapping coefficients;

inverse quantize the residual values of the color mapping coefficients based on the determined quantization value; and reconstruct the color mapping coefficients based on the decoded residual values and predicted values of the color mapping coefficients;

generate the 3D lookup table based on the number of octants for each of the color components and color values associated with the color mapping coefficients for each of the octants;

decode residual data of video blocks of the video data; and reconstruct the video blocks of the video data based on the decoded residual data and at least one reference picture generated using the 3D lookup table.

* * * * *